(12) United States Patent
Kruse et al.

(10) Patent No.: US 10,122,757 B1
(45) Date of Patent: Nov. 6, 2018

(54) SELF-LEARNING ACCESS CONTROL POLICIES

(71) Applicant: Amazon Technologies, Inc., Seattle, WA (US)

(72) Inventors: William Frederick Hingle Kruse, Seattle, WA (US); Ashish Rangole, Bellevue, WA (US); James E. Scharf, Jr., Seattle, WA (US); Kai Zhao, Seattle, WA (US); Jeffrey John Wierer, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/574,328

(22) Filed: Dec. 17, 2014

(51) Int. Cl.
*G06F 17/00* (2006.01)
*H04L 29/06* (2006.01)

(52) U.S. Cl.
CPC .............. *H04L 63/20* (2013.01); *H04L 63/10* (2013.01)

(58) Field of Classification Search
CPC ..... H04L 63/0227; H04L 63/20; H04L 63/14; G06F 17/30507; G06F 2221/2141; G06F 17/30598; G06F 17/30085; G06F 17/30705
USPC ........................................................ 709/225
See application file for complete search history.

(56) References Cited

U.S. PATENT DOCUMENTS

| | | | |
|---|---|---|---|
| 7,290,275 B2 * | 10/2007 | Baudoin ................ | G06Q 40/08 726/1 |
| 7,383,568 B1 * | 6/2008 | Newstadt ............ | H04L 63/0263 726/1 |
| 8,074,256 B2 * | 12/2011 | Valente ............... | H04L 41/0266 709/223 |
| 8,141,125 B2 | 3/2012 | Maes | |
| 8,176,527 B1 | 5/2012 | Njemanze et al. | |
| 8,266,673 B2 * | 9/2012 | Hu ...................... | H04L 63/0227 726/1 |
| 8,290,841 B2 * | 10/2012 | Beigi ..................... | G06Q 40/00 705/35 |
| 8,347,368 B2 * | 1/2013 | Kato ....................... | G06F 21/31 726/7 |
| 8,434,126 B1 * | 4/2013 | Schepis ............ | H04N 21/44222 726/1 |
| 8,490,163 B1 | 7/2013 | Harsell et al. | |
| 8,560,836 B2 | 10/2013 | Roegner | |
| 8,621,552 B1 * | 12/2013 | Lotem ................. | H04L 63/0263 709/223 |
| 8,656,470 B2 * | 2/2014 | Ishii .................... | H04N 1/00244 358/1.15 |
| 9,058,210 B2 * | 6/2015 | Avalani ................ | G06F 9/5011 |
| 9,077,758 B1 | 7/2015 | McGovern et al. | |

(Continued)

*Primary Examiner* — Farid Homayounmehr
*Assistant Examiner* — Lizbeth Torres-Diaz
(74) *Attorney, Agent, or Firm* — Davis Wright Tremaine LLP

(57) ABSTRACT

Techniques for self-learning access control policies are disclosed herein. A set of security policy modification recommendations is produced based on set of effective permissions and also based on a set of requests for access subject to that set of effective permission. Each policy modification recommendation is configured to alter the set of effective permissions by performing one or more actions altering one or more of the effective permissions. A selected policy modification recommendation is provided that is configured to produce a modified set of effective permissions.

23 Claims, 13 Drawing Sheets

(56) References Cited

U.S. PATENT DOCUMENTS

| | | |
|---|---|---|
| 9,106,687 B1 | 8/2015 | Sawhney et al. |
| 9,626,328 B1 | 4/2017 | Kumar et al. |
| 9,813,447 B2 | 11/2017 | Rash et al. |
| 2002/0147801 A1 | 10/2002 | Gullotta et al. |
| 2003/0088786 A1* | 5/2003 | Moran ............... G06F 21/6218 726/4 |
| 2003/0110262 A1 | 6/2003 | Hasan et al. |
| 2003/0110397 A1 | 6/2003 | Supramaniam et al. |
| 2003/0226038 A1 | 12/2003 | Raanan et al. |
| 2004/0181476 A1 | 9/2004 | Smith et al. |
| 2004/0193606 A1 | 9/2004 | Arai et al. |
| 2004/0205342 A1 | 10/2004 | Roegner |
| 2004/0260947 A1 | 12/2004 | Brady et al. |
| 2005/0010819 A1* | 1/2005 | Williams ............ H04L 41/0853 726/4 |
| 2006/0143685 A1* | 6/2006 | Vasishth ............... G06F 21/577 726/1 |
| 2007/0124797 A1 | 5/2007 | Gupta et al. |
| 2007/0136814 A1 | 6/2007 | Lee et al. |
| 2007/0156670 A1 | 7/2007 | Lim |
| 2007/0157287 A1 | 7/2007 | Lim |
| 2007/0180490 A1 | 8/2007 | Renzi et al. |
| 2007/0283443 A1* | 12/2007 | McPherson ......... G06F 21/6218 726/26 |
| 2008/0222694 A1 | 9/2008 | Nakae |
| 2009/0158407 A1 | 6/2009 | Nicodemus et al. |
| 2009/0205016 A1* | 8/2009 | Milas ..................... G06F 21/41 726/1 |
| 2009/0254392 A1 | 10/2009 | Zander |
| 2009/0288135 A1 | 11/2009 | Chang et al. |
| 2010/0049558 A1* | 2/2010 | Beigi ..................... G06Q 10/10 705/35 |
| 2011/0125894 A1* | 5/2011 | Anderson ............. H04L 9/3213 709/224 |
| 2011/0197254 A1 | 8/2011 | Sallaka et al. |
| 2011/0209196 A1* | 8/2011 | Kennedy ................ G06F 21/55 726/1 |
| 2012/0124643 A1* | 5/2012 | Moriconi ............. H04L 63/102 726/1 |
| 2012/0216243 A1* | 8/2012 | Gill ........................ G06F 21/55 726/1 |
| 2013/0117847 A1 | 5/2013 | Friedman et al. |
| 2013/0179938 A1* | 7/2013 | Choi ...................... G06F 21/57 726/1 |
| 2013/0198811 A1 | 8/2013 | Yu et al. |
| 2013/0291115 A1 | 10/2013 | Chong et al. |
| 2014/0040979 A1* | 2/2014 | Barton .................... H04L 63/20 726/1 |
| 2014/0156588 A1 | 6/2014 | Mohanty et al. |
| 2014/0196103 A1* | 7/2014 | Chari ..................... H04L 63/20 726/1 |
| 2014/0196104 A1 | 7/2014 | Chari et al. |
| 2014/0279768 A1 | 9/2014 | Rash et al. |
| 2014/0359692 A1 | 12/2014 | Chari et al. |
| 2014/0379915 A1* | 12/2014 | Yang ................... H04L 63/101 709/225 |
| 2015/0082377 A1 | 3/2015 | Chari et al. |
| 2015/0143456 A1 | 5/2015 | Raleigh et al. |
| 2016/0044035 A1* | 2/2016 | Huang ................ H04L 63/0272 726/4 |
| 2016/0080399 A1* | 3/2016 | Harris ................. H04L 63/1416 726/23 |

* cited by examiner

SELF-LEARNING ACCESS CONTROL POLICIES

CROSS-REFERENCE TO RELATED APPLICATION

This application incorporates by reference for all purposes the full disclosure of co-pending U.S. patent application Ser. No. 14/574,308, filed Dec. 17, 2014, entitled "ACCESS CONTROL POLICY WARNINGS AND SUGGESTIONS".

BACKGROUND

Modern computer systems place a high importance on security of user access to system resources and on maintaining current and accurate polices for the permissions of computer system users to access those system resources. Resource owners, and other administrators of resources, often use such access control policies to control access by computer system users to computing resources in order to support the business needs of the resource owners, administrators, and users. In a computer system where many users may have several assigned roles, permissions, or policies associated with and relating to many different computing resources, maintaining user roles, permissions, or policies can grow increasingly complex, particularly as the size and/or complexity of the system or the number of computer system users increases.

Accordingly, a resource owner may grant access to resources in order to perform one or more actions on behalf of the resource owner while simultaneously ensuring the security of resources. In order to manage user privileges, a resource owner may delegate authority to access a given resource in a multiplicity of different ways to allow varying levels of access to the resource according to resource access policies. A principal (or set of principals) that are authorized by the delegation of authority to access the given resource may be referred to herein as "authorized delegates." Generally, in large-scale and other computing environments, changes in users, permissions, policies, or roles can make determining who has the ability to perform a given action on a resource, at a given time, a challenging problem and keeping such access policies current and secure can present further challenges. Further, the goals of keeping privileges current and secure can compete with other goals. A centralized system for managing privileges can, for example, become out of date, become over-inclusive, become under-inclusive, or fail to adjust to changing system needs. Further, with complex systems, it is often not clear how changes to policies can affect the systems' operation. An administrator with permissions for modifying policies, for example, can inadvertently add unneeded permissions (resulting in a corresponding decrease in security) and/or remove needed permissions (potentially causing legitimate attempts to access resources to fail and/or causing a system to malfunction).

BRIEF DESCRIPTION OF THE DRAWINGS

Various embodiments in accordance with the present disclosure will be described with reference to the drawings, in which.

DETAILED DESCRIPTION

Figure 1:
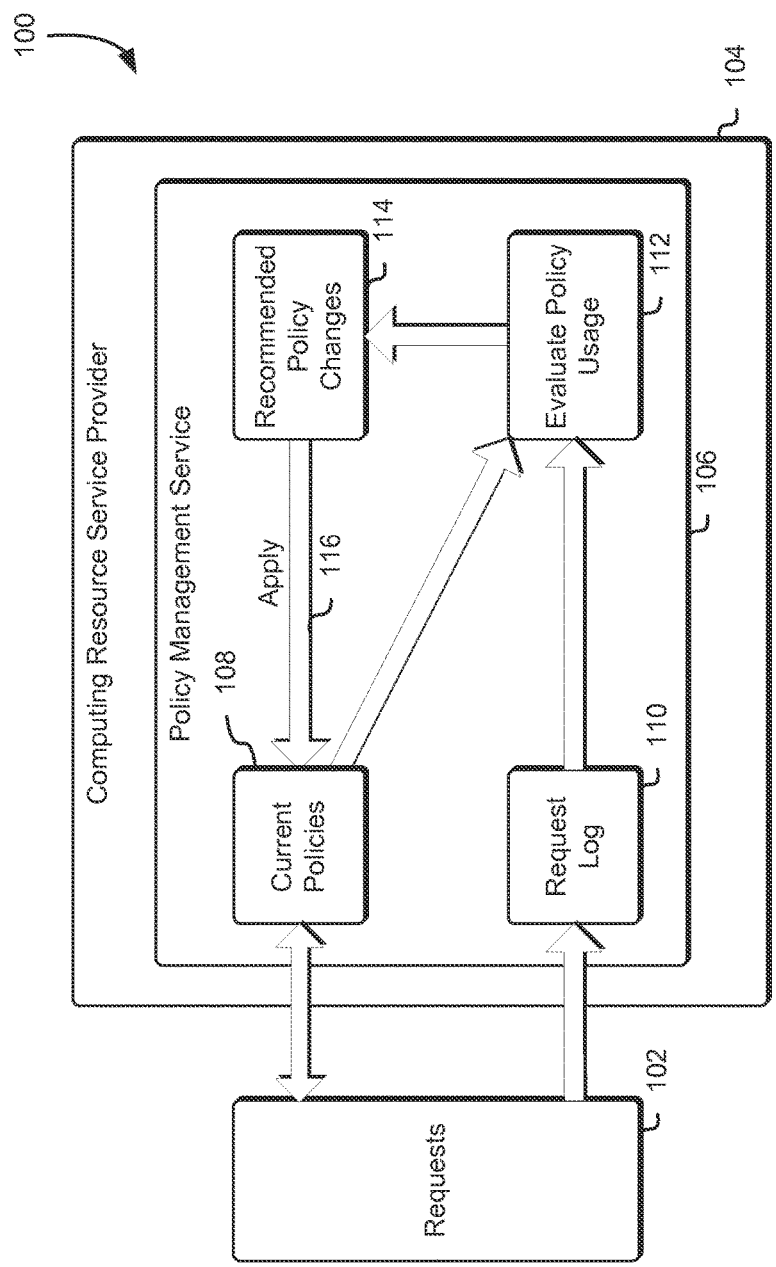
FIG. 1 illustrates an example environment in which access control policies may be automatically updated in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and processes for using a policy management service to manage responsibilities, permissions, roles, and/or policies associated with the access to computing resources. The policy management service may retrieve access control data (e.g., data indicating what requests have been made and which privileges were invoked by those requests) associated with computing resources and may use such data to evaluate existing policies. Permission modification recommendations (i.e., recommendations for changes) may be provided for policies that are determined to be sub-optimal and, in some embodiments, those recommended changes may be automatically performed by the policy management service. The policy management service may also provide a mechanism to administer such recommended changes such as, for example, providing a mechanism to approve proposed changes prior to their being performed.

In an embodiment, a policy management service automatically adjusts policies by continually evaluating policies against access control usage data. Access control usage data may comprise records and/or metadata that are associated with requests for access to resources that may, in turn, be based on one or more permissions associated with one or more policies. For example, with a set of permissions for a user USER1, a request by USER1 to read from resource 12345 may cause the computer system to generate an access control usage data record of such a request and also that the request was allowed. Similarly, a request by USER1 to write to resource 12345 outside of permitted times (i.e., if USER1 is only allowed to write to resource 12345 at certain times) may cause the computer system to generate an access control usage data of such a request, that the request was denied, and the reason that the request was denied.

Such access control usage records may be stored in the policy repository or may be stored in a separate repository associated with the policy management service. Such records may then be collected, aggregated, and/or otherwise processed into a form that is usable by the policy management service to improve access control policies by automatically generating recommended policy modifications based on the access control usage data. For example, repeated daily requests by USER1 to write to resource 12345 at around 9:45 AM (which could all be denied in this example) may be aggregated to produce a record indicating that the required permission is not present. Based on this record, the policy management service may automatically generate a permission modification recommendation that USER1 be granted write access to resource 12345 until a time after 9:45 AM (or another time, such as 15 minutes before 9:45 AM to allow for variations in submission time).

Recommended policy modifications may be automatically generated by the policy management service. Such modifications may be communicated to the policy management service using application programming interface ("API") calls such as those used to manually author and/or alter policies and may also be processed using the same procedures as those that are used for manually authored and/or altered policies. For example, an organization may have a procedure for verifying and approving all policy changes. In such an organization, the automatically generated recommended policy modifications may be verified using the same procedure. In some embodiments, at least a portion of the automatically generated recommended policy modifications may be allowed to bypass verification procedures and may instead be automatically implemented by the policy management service.

Automatically generated recommended access control policy modifications may cause the policy management service to alter access rights to computing resources associated with the organization according to the modified policy. Once the modified policy is implemented, new access information, including additions and removals of roles and access rights of the user, may be communicated to the policy management service. The policy management service may then alter permissions associated with the computing resources corresponding to the altered roles and access rights to enable (or disable) access by the user to interact with the computer resources. The policy management service may then begin evaluating the modified policy against the access control usage data and may recommend further access control policy modifications to the policy based on subsequent usage data.

FIG. 1 is an illustrative example of an environment 100 in which access control policies are automatically updated in accordance with an embodiment. Access control policies are collections of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345." A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345.

Access control policies may be maintained by a policy management service and may be stored in a policy repository. In an embodiment, a user with privileges for modifying permissions and/or for modifying a set of policies (e.g., an administrator or such other user with privileges for modifying a set of policies, also referred to herein as a "privileged user") of an organization may communicate with the policy management service using one or more API calls to request creation of policies, editing of policies, or deletion of policies. Such policy modification activities (e.g., creating and editing) may also be referred to herein as "authoring" a policy. The policies may, for example, be utilized to establish, for one or more users, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

Access control policies may be authored in a default state such as, for example, denying all access or granting all access. Access control policies may also be authored based on organizational business needs and/or may be based on roles within that organization so that, for example, all software developers have the same access control policy. Access control policies may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or suboptimal for some other reason.

A policy management service 106 may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests. For example, a service such as a service frontend (described herein) may receive a request for access to resources and may generate a query to the policy management service based at least in part on information specified by the request.

The policy management service 106 may be one of a plurality of services provided by a computing resource service provider 104. In some embodiments, the policy management service is a distributed computer system configured to centrally manage policies for multiple services operated by the computing resource service provider 104. Requests for access to service resources (i.e., requests whose fulfillment involves access to the resources themselves and/or information about the resources) may be evaluated against one or more policies associated with the request and/or associated with the requester and those requests that are allowable based on those polices may be performed. API calls to create, edit, and/or delete policies may also be received by the policy management service. As policies may change, so too may the scope of requests that are allowable change. For example, an organization may have a default policy allowing reads from all storage resources of a certain class. Barring a specific policy restricting a certain user from performing such reads, the default policy would permit such reads by any user. A change to a default policy preventing all reads from that class of storage resource may prevent that certain user from reading from such resources, and may require that specific permissions be granted if that user required that access. Granting such permissions may require that the policy be edited to change the permissions. In some embodiments, actions that are attempted (e.g., reads from a storage resource) may be logged in a request log along with details about the request including, but not limited to, the requester, the resource, the action, the result, and any conditions, decisions, or other metadata associated with the request.

In addition to being processed by the policy management service (e.g., by being evaluated against the current policies 108), the requests 102 for access to computing resources may be logged in a request log 110. The resource usage data in the request log 110 may be produced based at least in part on one or more requests for access to computing resources. As an example of how requests may be logged in a request log 110, a user may (e.g., through API calls) submit requests to cause the computing resource service provider to perform one or more operations involving access to a storage resource (e.g., virtual storage device or file system) associated with a computer system provided by a computing resource service provider 104, where access to the storage resource may involve the storage resource itself and/or information associated with the storage resource. In the example illustrated in FIG. 1, the request log 110 is shown as within the policy management service 106. In some embodiments, the request log may be located outside of the policy management service 106 and may, for example, be provided as part of another service provided by the computing resource service provider 104 or may be provided by some other provider. Requests for resource usage data from the request log may be transmitted as queries, and such queries may be based on the proposed policy changes. For example, a policy change that would add access for a principal to a resource may cause the policy management service to query the request log for usage data implicated by that permission (i.e., usage data associated with that principal's access to that resource). The results of such queries may be provided in one or more data structures and may be optimized for searching by the policy management service as described below.

With the example of a file system, the requests may include, for example, a request to list the contents of a file system on the storage resource, a request to change to a subdirectory of the file system, a request to read the contents of a file stored in the subdirectory, and a request to make a change to the contents of that file. Each request may be logged in the request log 110 and the request log entry may specify the requester (e.g., a principal that authorized the request), the resource, the operation (e.g., list the contents of the file system, change to the subdirectory, the file read, and the file write), the permissions associated with the request, conditions relevant to the permissions, and the result of the request (i.e., whether it was allowed, denied, or there was some other result). In some embodiments, each of the operations may be associated with one or more entries in the request log 110.

The policy management service 106 may select one or more current policies 108 and may use data in the request log 110 to evaluate policy usage 112 to determine whether the current policies 108 are efficient and/or optimal. For example, an organization may have a default policy to deny all requests except those that are explicitly granted by one or more permissions in a policy associated with the requester. A requester may need to access a resource, but may not have been granted any permissions associated with that resource because, for example, the resource is a new resource and access permissions were not granted to the requester when the resource was created. Each request by the requester to access the resource may result in a denial of the request (based on the default policy) and an entry in the request log 110 specifying the requester, the resource, and/or the denial. After several failed attempts to access the resource, the policy management service 106 may evaluate policy usage 112 by first detecting the pattern of failed accesses, by next determining whether partial and/or full access to the resource may be granted to the requester (e.g., because such access is not precluded by some other policy), and finally by producing a recommended policy change that may specify adding one or more new effective permissions to a set of effective permissions associated with the requester, based on that determination and adding that recommended policy change to a set of recommended policy changes 114.

In another example, a requester may have access to a resource that the requester does not need and/or should not have. The unneeded access may have been granted by default, or may be access that the requester no longer uses, or may be access to a resource whose access-control policies have changed (i.e., a resource that has become more secure), or may be unneeded because of some other such reason. In such an example, there may not be any requests by the requester to access the unneeded resource in the request log 110 and, as a result, the policy management service may evaluate policy usage 112 and may determine that the requester has no need for one or more permissions granted by the policy. The policy management service may produce a recommended policy change that access to the unneeded resource be removed from the permissions of the requester and may add that recommended policy change to the set of recommended policy changes 114.

Recommended policy changes 114 may include adding permissions to a policy, removing permissions from a policy, or altering permissions associated with a policy (i.e., changing how the permission may be applied, or which resources it may be applied to). In some embodiments, permissions may be altered for a principal without altering any permissions associated with a policy. For example, recommended policy changes 114 may include adding or removing principals from groups, adding or removing roles from principals, altering metadata associated with delegation policies, altering metadata associated with organizational policies, or altering data and/or metadata associated with other policies. For example, a user may be a member of a group that has one or permissions granted by a group policy. Removing that user from that group may not alter any the text of the policy (i.e., the policy may remain unchanged for the other members of the group), but the set of effective permissions for the user may change as that user may no longer have the permissions formerly granted by membership in the group.

One or more of the recommended policy changes 114 may then be applied 116 to the current policies 108 to produce new policies. The cycle may then continue, using requests from the request log 110 to evaluate policy usage 112 and to produce recommended policy changes 114, which, when applied 116 may cause the current policies 108 to become more efficient and/or closer to ideal (i.e., to not require more adjustment to make the policy conform to the usage of the principal). In some embodiments, entries in the request log 110 may be further processed by the policy management service 106 and/or by a service associated with the policy management service 106 to combine, aggregate, and/or analyze the requests 102. In such embodiments, the processing of the entries in the request log may be performed in an effort to reduce the volume of data that must be analyzed to evaluate the policy usage. For example, an organization may have thousands of requesters, making hundreds of requests an hour for access to tens of thousands of computing resources. In such an example, millions of request log entries may be generated every day and the data processing and/or aggregation of such request log entries may improve the efficiency of the process to evaluate policy usage 112.

Figure 2:
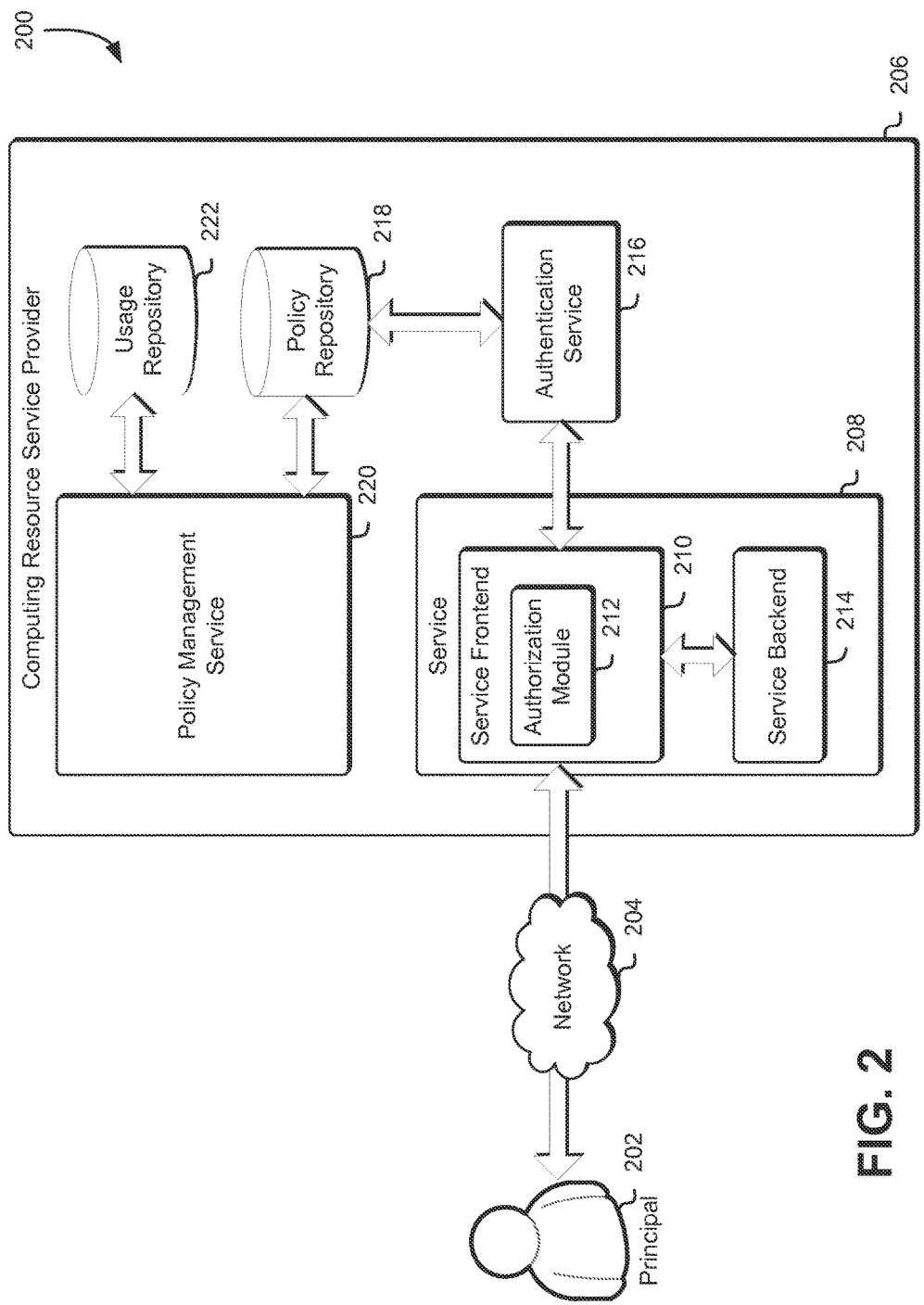
FIG. 2 illustrates an example environment in which access control policies may be managed in accordance with an embodiment.

FIG. 2 is an illustrative example of an environment 200 in which access control policies may be managed in accordance with an embodiment. In an embodiment, a principal 202 may use a computing device to communicate over a network 204 with a computing resource service provider 206. Communications between the computing resource service provider 206 and the principal 202 may, for instance, be for the purpose of accessing a service 208 operated by the computing resource service provider 206, which may be one of many services operated by the computing resource service provider 206. The service 208 may comprise a service frontend 210 and a service backend 214. The principal 202 may issue a request for access to a service 208 (and/or a request for access to resources associated with the service 208) provided by a computing resource service provider 206. The request may be, for instance, a web service application programming interface request. The principal may be a user, or a group of users, or a role associated with a group of users, or a process representing one or more of these entities that may be running on one or more remote (relative to the computing resource service provider 206) computer systems, or may be some other such computer system entity, user, or process. Each user, group, role, or other such collection of principals may have a corresponding user definition, group definition, role definition, or other definition that defines the attributes and/or membership of that collection. For example, a group may be a group of principals that have the same geographical location. The definition of that group of principals may include the membership of the group, the location, and other data and/or metadata associated with that group. As used herein, a principal is an entity corresponding to an identity managed by the computing resource service provider, where the computing resource service provider manages permissions for the identity and where the entity may include one or more sub-entities, which themselves may have identities.

The principal 202 may communicate with the computing resource service provider 206 via one or more connections (e.g., transmission control protocol (TCP) connections). The principal 202 may use a computer system client device to connect to the computing resource service provider 206. The client device may include any device that is capable of connecting with a computer system via a network, such as example devices discussed below. The network 204 may include, for example, the Internet or another network or combination of networks discussed below.

The computing resource service provider 206, through the service 208, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 208 may be received by a service frontend 210, which, in some examples, comprises a web server configured to receive such requests and to process them according to one or more policies associated with the service 208. The request for access to the service 208 may be a digitally signed request and, as a result, may be provided with a digital signature. The service frontend 210 may then send the request and the digital signature for verification to an authentication service 216. The authentication service 216 may be a stand-alone service or may be part of a service provider or other entity. The authentication service 216, in an embodiment, is a computer system configured to perform operations involved in authentication of principals. In some examples, requests submitted to the service frontend 210 are digitally signed by the principal (i.e., by a computing device used by or operating on behalf of the principal) using a symmetric cryptographic key that is shared between the principal 202 and the authentication service 216. The authentication service, therefore, may use a copy of the symmetric cryptographic key to verify digital signatures of requests purported to have been generated by the principal 202. However, in other embodiments, the authentication service 216 may be configured to utilize asymmetric cryptography for digital signature verification such as, for example, when the principal digitally signs requests using a private cryptographic key. In such embodiments, the authentication service may be configured to trust a certificate authority that digitally signed a certificate of the principal 202 corresponding to the private cryptographic key. Consequently, in some embodiments, the authentication service may use a public cryptographic key specified by the certificate.

Upon successful authentication of a request, the authentication service 216 may then obtain policies applicable to the request. A policy may be applicable to the request by way of being associated with the principal 202, a resource to be accessed as part of fulfillment of the request, a group in which the principal 202 is a member, a role the principal 202 has assumed, and/or otherwise. To obtain policies applicable to the request, the authentication service 216 may transmit a query to a policy repository 218 managed by a policy management service 220, which may be the policy management service discussed above in connection with FIG. 1. The policy management service 220 may also obtain usage history associated with the policy and/or the permissions associated with the policy by transmitting a query to a usage repository 222. The usage repository may include records of previous access control usage requests such as the requests obtained from request log 110 described herein in connection with FIG. 1. The records of previous access control usage requests obtained from, for example, the request log, may be referred to herein as "obtained information" or as "obtained information records" or simply as "records."

The query to the policy repository 218 may be a request comprising information sufficient to determine a set of policies applicable to the request. The query to the policy repository may, for instance, contain a copy of the request and/or contain parameters based at least in part on information in the request, such as information identifying the principal, the resource, and/or an action (operation to be performed as part of fulfillment of the request). The query to the usage repository 222 may be a request comprising information sufficient to determine past usage of permissions (i.e., requests for access managed by one or more permissions) associated with the set of policies. The query to the usage repository 222 may, for example, include copies of the policies and/or permissions, a copy of the request, parameters, and/or metadata associated with the policies, permissions, or request, and/or other such data and/or metadata. The policy repository 218 and/or the usage repository 222 may be databases or other systems operable to process queries. The policy repository 218 and/or the usage repository 222 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies applicable to the request, the authentication service 216 may provide an authentication response and, if applicable, the obtained policies back to the service frontend 210. The authentication response may indicate whether the response was successfully authenticated. The service frontend 210 may then check whether the fulfillment of the request for access to the service 208 would comply with the obtained policies using an authorization module 212. An authorization module 212 may be a process executing on the service frontend that is operable to compare the request to the one or more permissions in the policy to determine whether service may satisfy the request (i.e., whether fulfillment of the request is authorized). For example, the authorization module may compare an API call associated with the request against permitted API calls specified by the policy to determine if the request is allowed. If the authorization module 212 is not able to match the request to a permission specified by the policy, the authorization module 212 may execute one or more default actions such as, for example, providing a message to the service frontend that causes the service frontend to deny the request, and causing the denied request to be logged in the policy management service 220. If the authorization matches the request to one or more permissions specified by the policy, the authorization module 212 may resolve this by selecting the least restrictive response (as defined by the policy) and by informing the service frontend whether the fulfillment of the request is authorized (i.e., complies with applicable policy) based on that selected response. The authorization module 212 may also by select the most restrictive response or may select some other such response and inform the service frontend whether the fulfillment of the request is authorized based on that selected response. Note that, while FIG. 2 shows the authorization module 212 as a component of the service frontend 210, in some embodiments, the authorization module 212 is a separate service provided by the computing resource service provider 206 and the frontend service may communicate with the authorization module 212 over a network.

Finally, if the fulfillment of the request for access to the service 208 complies with the applicable obtained policies, the service frontend 210 may fulfill the request using the service backend 214. A service backend 214 may be a component of the service configured to receive authorized requests from the service frontend 210 and configured to fulfill such requests. The service frontend 210 may, for instance, submit a request to the service backend to cause the service backend 214 to perform one or more operations involved in fulfilling the request. In some examples, the service backend 214 provides data back to the service frontend 210 that the service frontend provides in response to the request from the principal 202. In some embodiments, a response to the principal 202 may be provided from the service frontend 210 indicating whether the request was allowed or denied and, if allowed, one or more results of the request.

Figure 3:
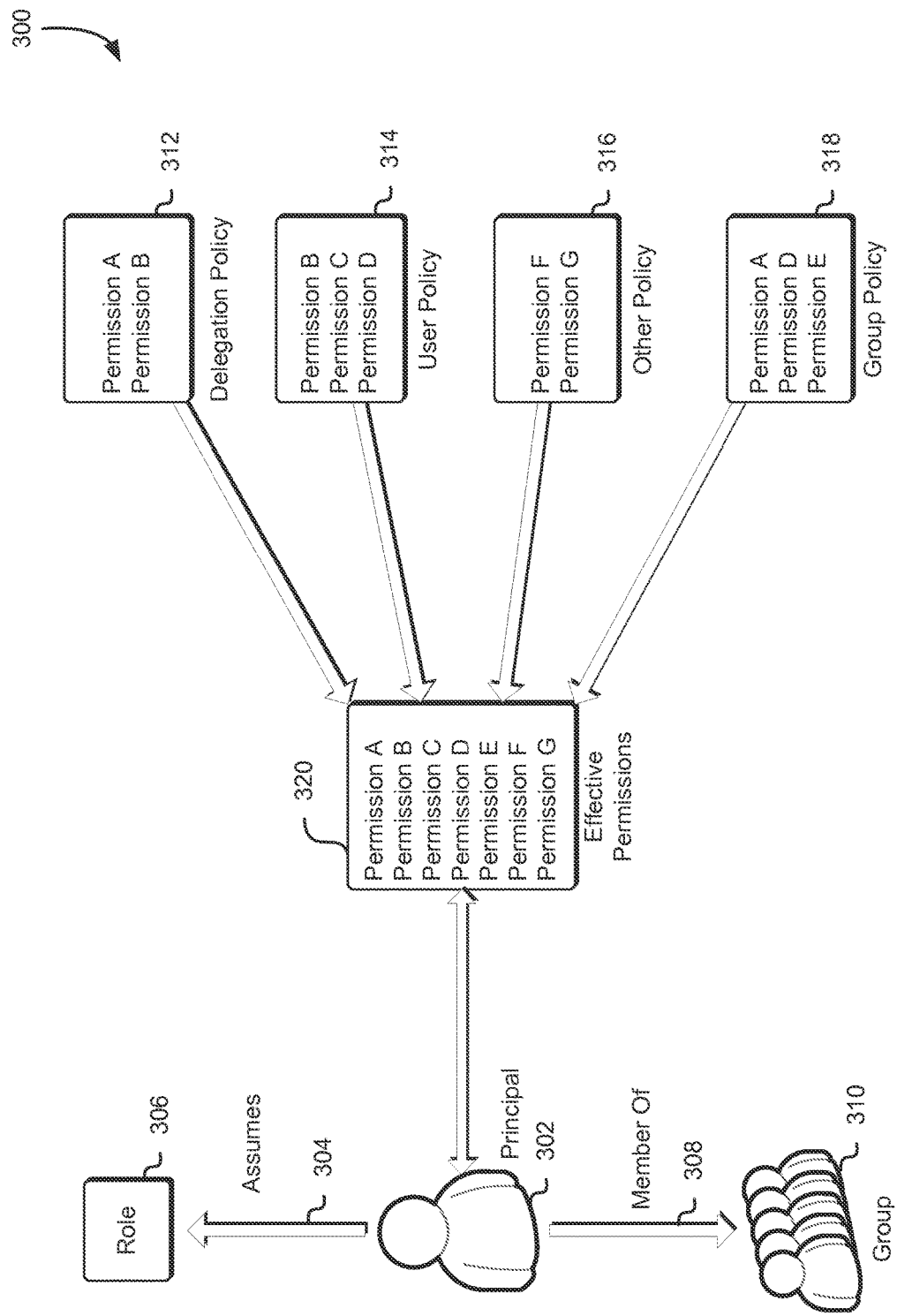
FIG. 3 illustrates an example diagram in which permissions associated with access control policies may be consolidated and altered in accordance with an embodiment.

FIG. 3 is an illustrative example of a diagram 300 illustrating relationships between various aspects of the present disclosure in which permissions associated with access control policies may be consolidated in accordance with an embodiment. A principal 302 such as the principal 202 described herein in connection with FIG. 2 may have a set of effective permissions 320, which may be an aggregate of the permissions granted by one or more policies associated with that principal's access to computing resources. The set of effective permissions 320 may specify a plurality of permissions which detail resources the principal 302 may access, which resources the principal 302 may not access, and under which conditions access to those resources may be allowed (or granted) or denied. For example, a set of effective permissions may include one or more permissions that are associated with the principal, and one or more permissions that come from a different source such as, for example, a group policy, a delegation policy, roles assumed by the principal, organizational policies, or default policies. With respect to a policy, the policy's effective permissions may be those permissions that the policy explicitly or implicitly defines. For instance, a policy may explicitly grant a principal a set of permissions to perform a set of actions in connection with a resource. As another example, a policy may implicitly grant permissions to principals by granting permissions to a group (of which the principals are a member). The effective permissions of a policy may change over time. For example, a policy may be a role policy and principals able to assume the role may change over time despite the policy remaining static. As a result, effective permissions may change as the principals authorized to assume the role change. In other words, an effective permission is an access right of a principal to perform an action on a resource. A policy may grant effective permissions explicitly (i.e., by specifying the principal, the action, and the resource) and/or implicitly (i.e., by specifying the permissions in a way that leaves one or more of the principal, action, or resource unspecified explicitly).

In an embodiment where a default policy is to deny access to resources, the permissions may specify which resources are allowed. In an embodiment where the default policy is to allow access to resources, the permissions may specify access to the resources which are not explicitly denied. In an embodiment with some other default policy, the permissions may specify a combination of allowed and denied resource access. In some embodiments, the set of effective permissions 320 may be an aggregation of permissions for a particular resource and/or class of resources. In some embodiments, the set of effective permissions 320 may be an aggregation of permissions for multiple resources (e.g., an aggregation of permissions associated with all resources managed by a service for the user, an aggregation of permissions associated with a user account, or some other aggregation of permissions).

The set of effective permissions 320 may specify a combination or aggregation of permissions based on aspects of the principal. For example, if the principal 302 is a user, then the set of effective permissions 320 may specify one or more user policy permissions 314. User policy permissions 314 may include permissions related to the type of the principal 302 (i.e., a "user," a "group," or an "organization") and may also include permissions associated with a specific set of credentials associated with the identity of the principal 302.

In addition to permissions related to the class and/or the identity of the principal 302, the set of effective permissions 320 may specify one or more delegation policy permissions 312 as a result of the principal 302 assuming 304 one or more roles 306 specified within an organization. As an example, a principal 302 may be a software developer and may assume 304 a software developer role in his or her day-to-day activities and may become an authorized delegate for the set of permissions associated with assuming the software developer role. A software developer role may specify a set of delegation policy permissions 312 that are included in the set of effective permissions 320 associated with the principal 302. There may be some overlap in the user policy permissions 314 and the delegation policy permissions 312 (e.g., "Permission B"). There may also be conflicts between the user policy permissions 314 and the delegation policy permissions 312. For example, "Permission A" in delegation policy permissions 312 may grant access to a resource at all times, while "Permission C" in user policy permissions 314 may deny such access. In the event of such conflicts, a default policy and/or a default policy conflict resolution standard may prevail (i.e., to prefer denial or to prefer granting).

Similarly, the set of effective permissions 320 may specify one or more group policy permissions 318 as a result of a principal 302 being a member of 308 one or more groups 310 (e.g., a production group). The set of effective permissions 320 may also specify one or more other policy permissions 316 such as those associated with default policies, organizational policies, policies associated with certain applications, policies associated with heightened security conditions, temporary polices, or other such policies.

A principal 302 may also assume multiple roles, and thus multiple sets of role policy permissions. For example, the principal 302 that assumes a software developer role in his or her day-to-day activities may, at some point during his or her day, need more permissions such as those which may be associated with a system administrator role. In such an example, the principal may temporarily assume a system administrator role, perform one or more privileged operations granted by that role, and then may release that role, thereby returning his or her policy to the less privileged set of permissions. As may be contemplated, the types of roles and the associated permissions described in association with those roles are illustrative examples and other types of roles and associated positions may be considered as within the scope of the present disclosure.

Permissions associated with the set of effective permissions 320 may be altered for the principal 302 by adding and/or removing permissions (i.e., as a result of API calls to a policy management service) from the delegation policy permissions 312, from the user policy permissions 314, from the group policy permissions 318, from the other policy permissions 316, or from other such groups of permissions. For example, removing "Permission E" from the set of effective permissions 320 may be accomplished by removing that permission from the group policy permissions 318. Such a removal may also remove that permission from any other principals who are members of that group which may or may not be a desirable effect. Redundant permissions may be removed from a policy. For example, users with user policy permissions 314 and with delegation policy permissions 312 have "Permission B" granted by both policies and as such, "Permission B" may be removed from either delegation policy permissions 312 or user policy permissions 314 without altering the permissions in the set of effective permissions 320. In both of these examples, other policy modification actions may also accomplish the same result (e.g., altering group membership and/or role assignments as described herein).

For example, the principal may be removed from the group (rather than altering the permissions of the group) and, because in the example illustrated in FIG. 3, "Permission A" and "Permission D" are granted by other policy permissions, the result would be to remove "Permission E" from the principal without altering the permissions of other principals. Similarly, permissions for a principal may be altered by adding the principal to a new group with different permissions (i.e., a newly created and/or previously specified group), assuming and/or releasing roles from the principal, altering roles, splitting groups based on the principals and/or the desired permissions, or other such actions. For example, a group may have ten members and may grant five permissions. Five of the group members may be suited to having the first four permissions and five of the group members may be suited to having the last three permissions. Splitting this group into two groups, each of which has the appropriate permissions and then making the appropriate principals members of the appropriate groups may make the permissions more optimal for each of the members.

Figure 4:
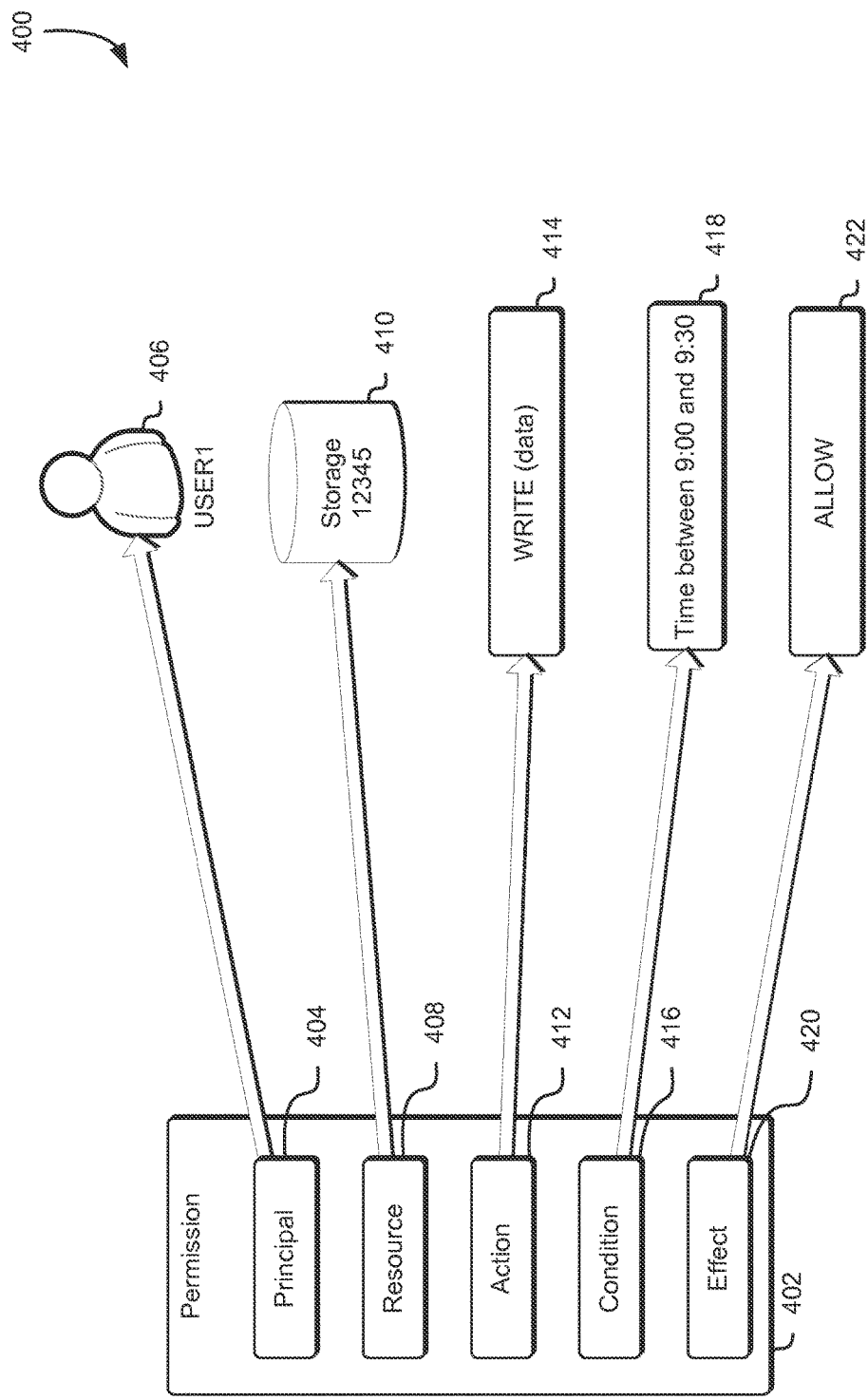
FIG. 4 illustrates an example diagram in which a permission associated with an access control policy is illustrated in accordance with an embodiment.

FIG. 4 is an illustrative example of a diagram 400 illustrating relationships between various aspects of the present disclosure in which a permission associated with an access control policy is illustrated in accordance with an embodiment. In an embodiment, a permission 402 may specify a principal 404, a resource 408, an action 412, a condition 416, and an effect 420. In some embodiments, a permission may also specify a plurality of one or more of these elements such as, for example, a set or class of users, a collection of resources, several different actions, and/or multiple conditions.

The principal 404 may be a user, a group, an organization, a role, or a collection and/or combination of these or other such entities. A principal 404 may be any entity that is capable of submitting API calls that cause an action associated with a resource to be performed and/or any entity to which permissions associated with a resource may be granted. In the example permission 402 illustrated in FIG. 4, the principal 404 is a user 406 identified as "USER1." The action 412 may be any action that may be performed in association with the resource and may, for example, be identified by a type of API call, a library call, a program, process, series of steps, a workflow, or some other such action. For example, an action may be a set of operations that may be performed as part of the fulfillment of an API call to, for example, a webservice. The actions that are performed may be a subset of those actions and/or may be a single operation. The operations may also be performed in a defined order, may be repeated, or may be shared between a plurality of API calls. In the example permission 402 illustrated in FIG. 4, the action is an API call to write data to the resource. The permission 402 illustrated in FIG. 4 may be one of a plurality of permissions specified by user policy permissions, such as those described in connection with FIG. 3. The example permission 402 illustrated in FIG. 4 further specifies a storage resource 410 for the resource 408, a data write API call 414 for the action 412, a time condition 418 for the condition 416, and an ALLOW effect 422 for the effect 420. The example permission thus specifies that "USER1 is ALLOWED to WRITE to 12345 between 9:00 AND 9:30 AM."

Figure 5:
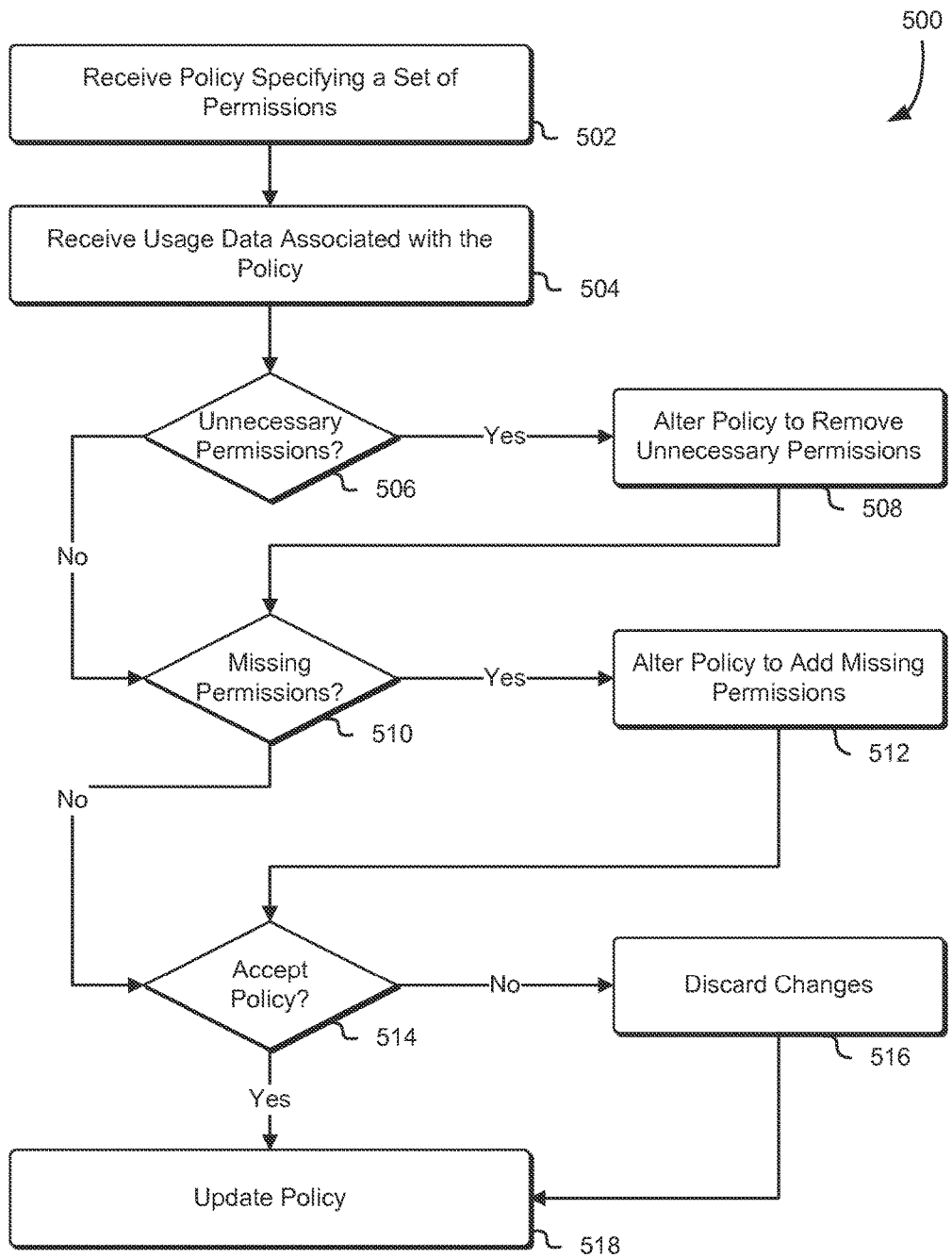
FIG. 5 illustrates an example of a process for automatically updating access control policies in accordance with an embodiment.

FIG. 5 is an illustrative example of a process 500 for automatically updating access control policies in accordance with an embodiment. A policy management service such as the policy management service 106 described in connection with FIG. 1, or a component thereof, such as a web server, may perform the process 500 illustrated in FIG. 5.

A policy management service may first receive a policy that specifies a set of permissions 502 (e.g., via an API call to a web server of the policy management service). The policy management service may next receive usage data associated with the policy 504 from, for example, a repository of such usage data. In some embodiments, the policy management service may request the usage data from the repository based upon the policy. The usage data may be data and/or metadata from one or more resource usage logs which may indicate usage of permissions associated with the policy 504 and/or may include a set of data from a repository of consolidated data from such resource usage logs. The policy management service may first examine the usage data to determine whether there are any unnecessary permissions granted by the policy 506 by comparing the usage data to the policy. Unnecessary permissions may include permissions that are not used (according to the usage log) and may also include permissions that should not be granted. For example, an application (which may be a type of principal) may have permissions it does not need and/or should not have based upon its functionality. Such permissions may be determined by the policy management service as unnecessary. In the event that unnecessary permissions are identified, the policy may be altered 508 to remove the unnecessary permissions by performing one or more actions including, but not limited to, removing permissions, altering groups, altering roles, splitting groups, changing group membership, changing role assignments, or a combination of these and/or other such actions, as described herein in connection with FIG. 3.

The policy management service may next examine the usage data to determine whether there are any missing permissions that are not granted by the policy 510. Missing permissions may be determined from usage data by, for example, detecting the presence of one or more denied requests in the usage data logs. In the event that missing permissions are identified, the policy may be altered 512 to add the missing permissions by performing one or more of the policy altering actions described herein. The policy management service may then determine whether to accept the policy 514. In the event that one or more of the policy changes are not approved, those changes may be discarded. If at least a portion of the changes are approved, the policy may be updated 518 and thus may become operable, thereby granting a new set of permissions.

In some embodiments, approval of the altered policy may be requested from a user of the system. In some embodiments, approval of the policy may be automatic (i.e., may be applied without requiring explicit approval of the specific altered policy) based on one or more policy acceptance criteria specified in association with the system. In such embodiments, the policy may become active (i.e., may replace the previous policy) without approval because, for example, the system is configured to automatically apply policy changes based on one or more criteria for accepting recommended policy changes as described below. In some embodiments, a portion of the recommended policy changes may be approved and a portion may be discarded. In such embodiments, a user may make further changes to a policy after the permission modification recommendations are received and applied. For example, a recommended policy may not meet all of the needs of a principal or may remove permissions that will be needed in the future. Such alterations after the permission modification recommendations are applied may require additional approval before being applied.

In some embodiments, recommended policy changes may also be rated and ranked according to one or more factors including, but not limited to, the destructiveness of the API associated with the permissions, the complexity of the policy, the permissiveness of the policy, conformance to default policy behavior, comparison to policies and/or usage patterns of other organizations or users (i.e., by comparing one or more common attributes of the organization or user to that of one or more principals associated with the recommended policy change), predicted effects of the policy changes (i.e., changes determined by simulating or otherwise predicting the impact of the policy changes), or other such factors. Such ratings and rankings are described in more detail below. For example, attributes associated with a user including, but not limited to, age, geographic location, nationality, organization, job title, device, device operating system, may be used to inform recommended policy changes by comparing those attributes to those of other users. Recommended policy changes may be presented for approval based on the ratings and rankings and may also be automatically approved and/or automatically denied based at least in part on these ratings and rankings.

Figure 6:
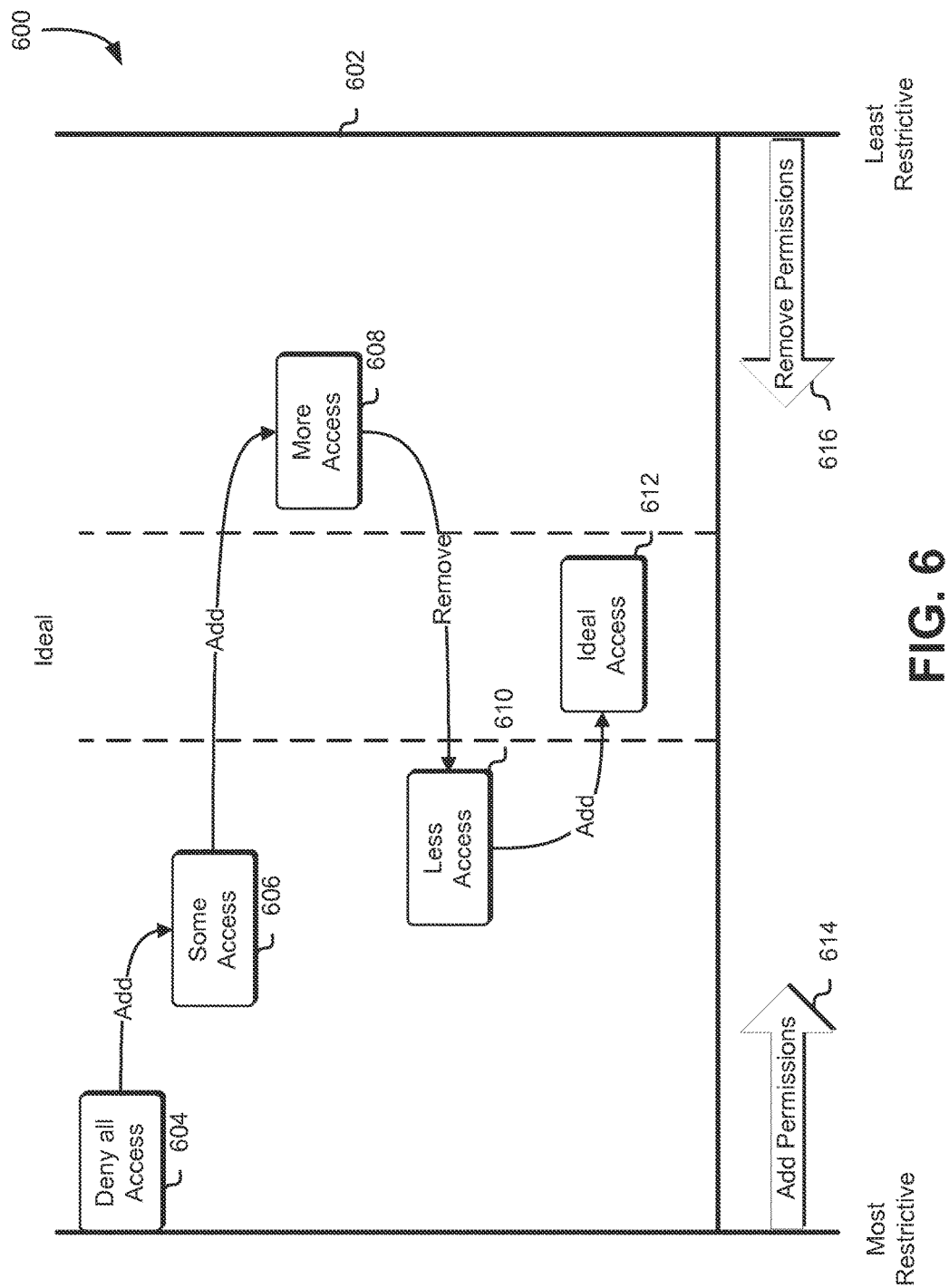
FIG. 6 illustrates an example diagram in which an access control policy may be automatically made more optimal in accordance with an embodiment.

FIG. 6 is an illustrative example of a diagram 600 illustrating relationships between various aspects of the present disclosure in which an access control policy may be automatically made more optimal in accordance with an embodiment. A default policy to deny all access 604 is shown on a continuum 602. The policy to deny all access 604 is located at the most restrictive end of the continuum. Adjustments that add permissions 614 to the policy move it toward the least restrictive end of the continuum 602 and adjustments that remove permissions 616 from the policy move it toward the most restrictive end of the continuum 602. An "Ideal" region is illustrated near the middle of the continuum that represents the optimal, ideal, or most efficient policy along the continuum based on the policy not requiring more adjustments to make it conform to the actual usage of the principal. As may be contemplated, while the example continuum illustrated in FIG. 6 is one dimensional (i.e., measured on a single dimension of "restrictiveness"), a policy may be optimized for several factors simultaneously when trying to find the optimal, ideal, or most efficient policy.

In the example illustrated in FIG. 6, the policy to deny all access 604 first has actions performed to add some permissions and to allow some access 606. As this change does not produce a policy with ideal access, additional actions may be performed to add more permissions and to produce a policy with more access 608. As used herein with reference to a policy, the term "ideal" may refer to a policy that has effective permissions that conform to the actual usage data of the principal and/or effective permissions that conform to policy guidelines associated with the principal. For example, a policy that has unused permissions, has missing permissions, that is overly complex, that is overly permissive may not be ideal. This policy may have too much access (i.e., may have unnecessary permissions) and so actions may be performed to remove some permissions and produce a policy with less access 610. This policy is nearly ideal, but still more actions may be performed to produce a policy with ideal access 612. It should be noted that the ideal access region illustrated in FIG. 6 may be dynamic and may change due to, for example, changing system conditions. Changes in the ideal access region may necessitate additional adjustments to the policy to conform to the new standard.

Figure 7:
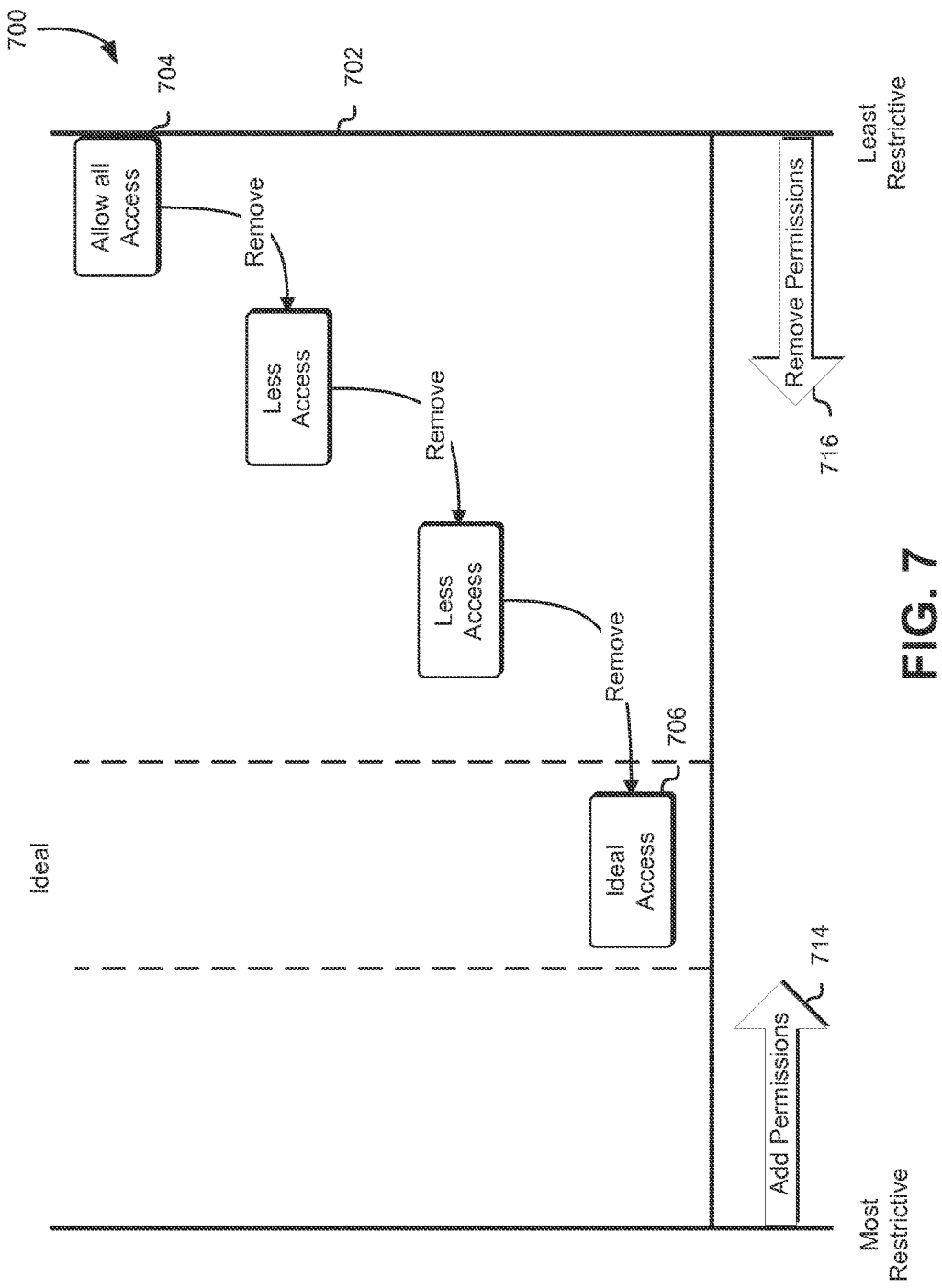
FIG. 7 illustrates an example diagram in which an access control policy may be automatically made more optimal in accordance with an embodiment.

FIG. 7 is an illustrative example of a diagram 700 illustrating relationships between various aspects of the present disclosure in which an access control policy may be automatically made more optimal in accordance with an embodiment. A policy to allow all access 704 is shown on a continuum 702. The policy to allow all access 704 may be located at the least restrictive end of the continuum. As illustrated on the continuum 702, adjustments that add permissions 714 to the policy move it toward the least restrictive end of the continuum 702 and adjustments that remove permissions 716 from the policy move it toward the most restrictive end of the continuum 702. As with the continuum illustrated in FIG. 6, an "Ideal" region is illustrated near the middle of the continuum that represents the optimal, ideal, or most efficient policy along the continuum. The example illustrated in FIG. 7 illustrates a simple series of actions, each of which, when performed, remove unneeded permissions from the policy that allows all access 704 to produce a policy with ideal access 706. The actions performed may, for example, be adjusting groups and roles for a user until the ideal access policy for that user is found. Such an approach may be useful in automatically determining the most restrictive and most effective policy associated with a user without manually authoring and adjusting such a policy.

Figure 8:
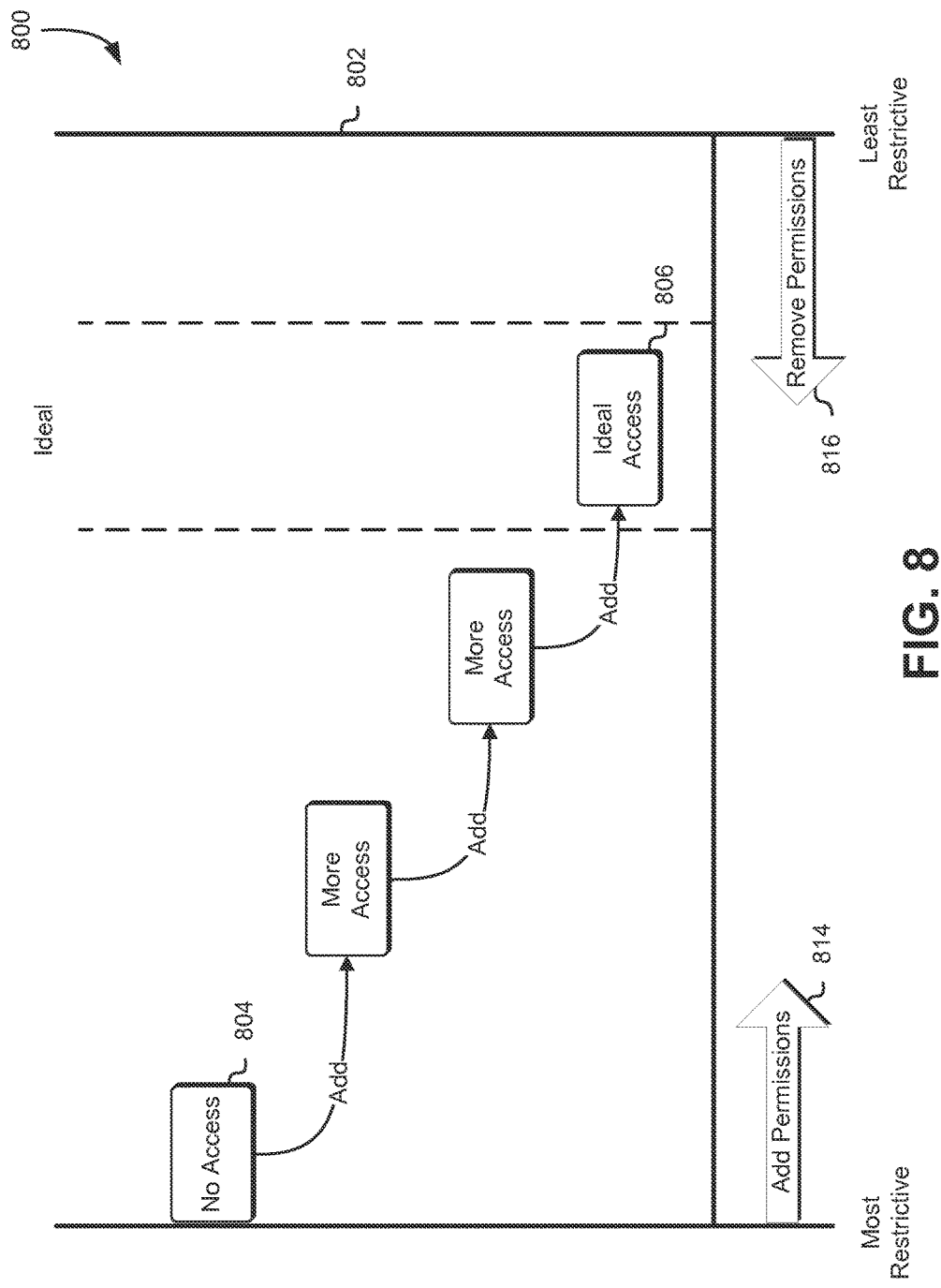
FIG. 8 illustrates an example diagram in which an access control policy may be automatically made more optimal in accordance with an embodiment.

FIG. 8 is an illustrative example of a diagram 800 illustrating relationships between various aspects of the present disclosure in which an access control policy may be automatically made more optimal in accordance with an embodiment. A policy that does not allow any access to any resources 804 is shown on a continuum 802. The policy that does not allow any access to any resources 804 may be located at the least restrictive end of the continuum. As illustrated on the continuum 802, adjustments that add permissions 814 to the policy move it toward the least restrictive end of the continuum 802 and adjustments that remove permissions 816 from the policy move it toward the most restrictive end of the continuum 802. As with the continuum illustrated in FIGS. 6 and 7, an "Ideal" region is illustrated near the middle of the continuum that represents the optimal, ideal, or most efficient policy along the continuum. The example illustrated in FIG. 8 illustrates a series of actions, each of which, when performed, add permissions to the policy. The actions may be performed as a result of one or more access or authorization failures. As a result of the one or more actions, the policy that does not allow any access to any resources 804 may be altered to produce a policy with ideal access 806. Such an approach may be useful in automatically determining the most restrictive and most effective policy associated with a user without manually authoring and adjusting such a policy.

Figure 9:
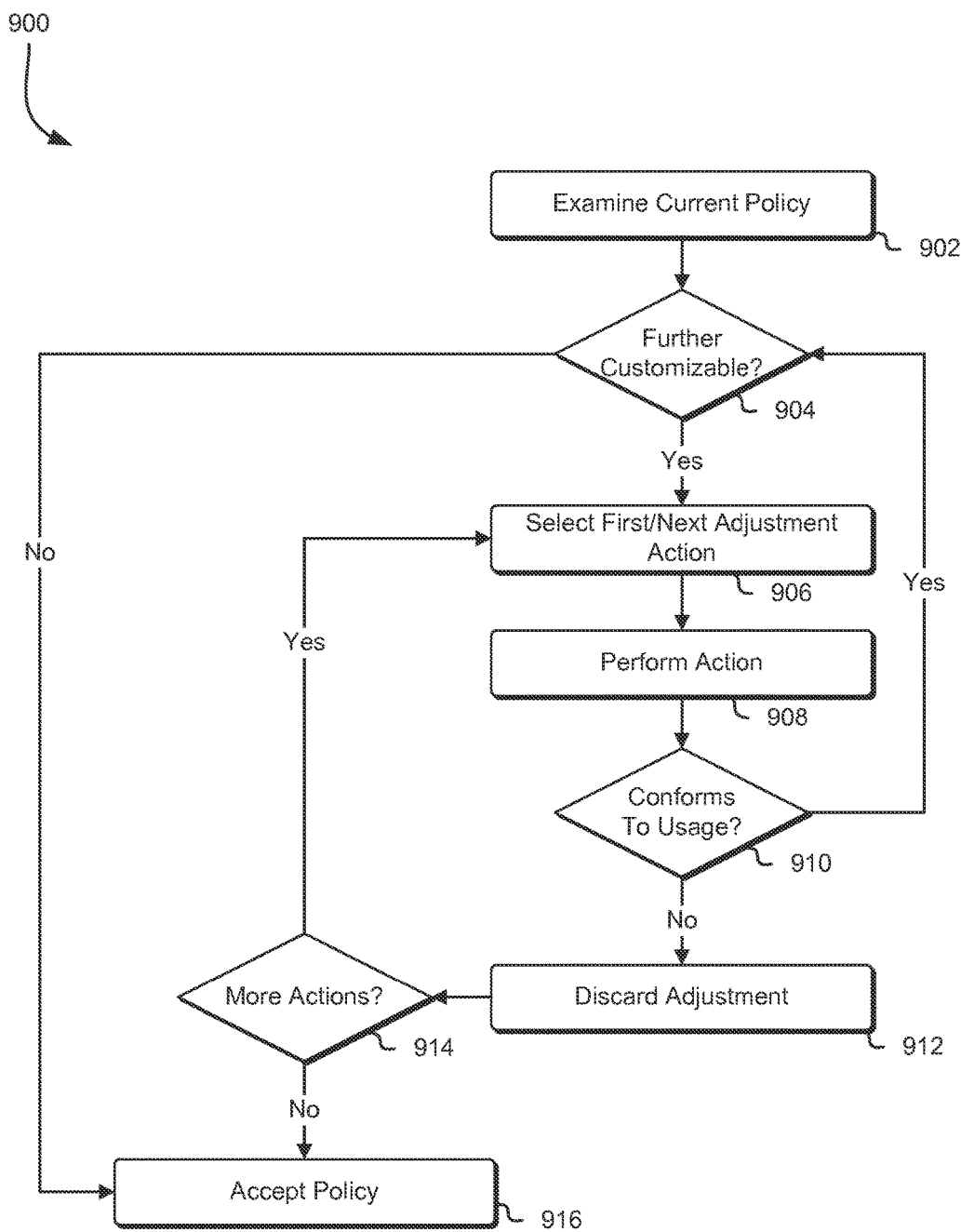
FIG. 9 illustrates an example of a process for making an access control policy more optimal in accordance with an embodiment.

FIG. 9 is an illustrative example of a process 900 for adjusting an access control policy, in accordance with an embodiment. A policy management service such as the policy management service 106 described in connection with FIG. 1 or a component thereof, such as a web server, may perform the process 900 illustrated in FIG. 9. The policy management service may first examine a current policy 902 to determine if the policy is could be adjusted or customized further. The determination of whether a policy could be adjusted or customized further may be based on one or more of the factors described herein. For example, the policy management service may include executable code for checking whether the policy grants permissions that are not needed by the use case for which the policy was written. If the policy management service determines that permissions A, B, and C are granted but only A and B are used, the policy may be customized further to remove the unused permission C. The policy management service may identify the unused permission C by evaluating recent usage against the policy and monitoring which permissions matched the usage of the permission. At the end of this analysis, any permissions which do not have corresponding usage may be candidates for removal.

The policy management service may also include executable code for checking whether the policy does not grant permissions that the users or applications to which the policy is applied are trying to exercise. These requests may appear as blocked usage in the resource usage logs and/or repository. The policy management service may parse these usage logs and may suggest that the policy may be further customized to include the needed, but not granted, permissions.

Additionally, the policy management service may include executable code for determining whether the policy may be further customized based on the simplicity (or complexity) of the policy. In some embodiments, a user may prefer an easier-to-read or shorter policy. If a policy contains overlapping permissions, the policy management service may recommend consolidating the permissions into a single statement. For example, if a policy grants permissions A, B, C, and B (repeated), the policy management service may recommend consolidating the policy into one that just allows permissions A, B, and C. To suggest this customization, the policy management service may sort the full list of permissions and remove one or more duplicates. In another example, if permission X implies permissions A, B, and C and the policy management service evaluates a policy that grants permissions A, B, C, and D, it may recommend that the policy be replaced by one that grants permissions X and D. To make this recommendation, the policy management service may need a list of permission sets which are implied by other permissions and compare that to the policy document. If there is a match, a further customization may be possible.

Additionally, the policy management service may include executable code for determining whether the policy may be further customized based on whether there are principals subject to the policy that do not exercise any of the permissions. The policy management service may examine the usage of each principal and compare it to the permissions of the policy. If the usage does not match, the policy management service may produce a recommendation that the policy be customized by not being associated with that principal.

If the policy can be further adjusted or customized 904, the policy management service may begin adjusting the policy by selecting a first adjustment action 906 (i.e., whether to remove permissions), performing that action 908, and determining if, as a result of the adjustment action, the policy has fewer potential customizations 910. If the policy has fewer potential customizations or that it better conforms to the actual usage, the policy service may next determine whether it is not the case that the policy can be further customized 904 (i.e., the policy is suitable for updating) as described above. If the adjustment action does not make the policy have fewer potential customizations 910, the adjustment may be discarded 912 and other actions 914 may be selected and performed (i.e., altering groups and/or roles). The process 900 may continue until there are no more actions to perform or until the policy is sufficiently ideal, upon which the policy may be accepted 916 (i.e., by accepting the policy adjustments and/or by providing a permission modification recommendation for approval by a system user and, upon approval, updating the policy in the policy repository).

Figure 10:
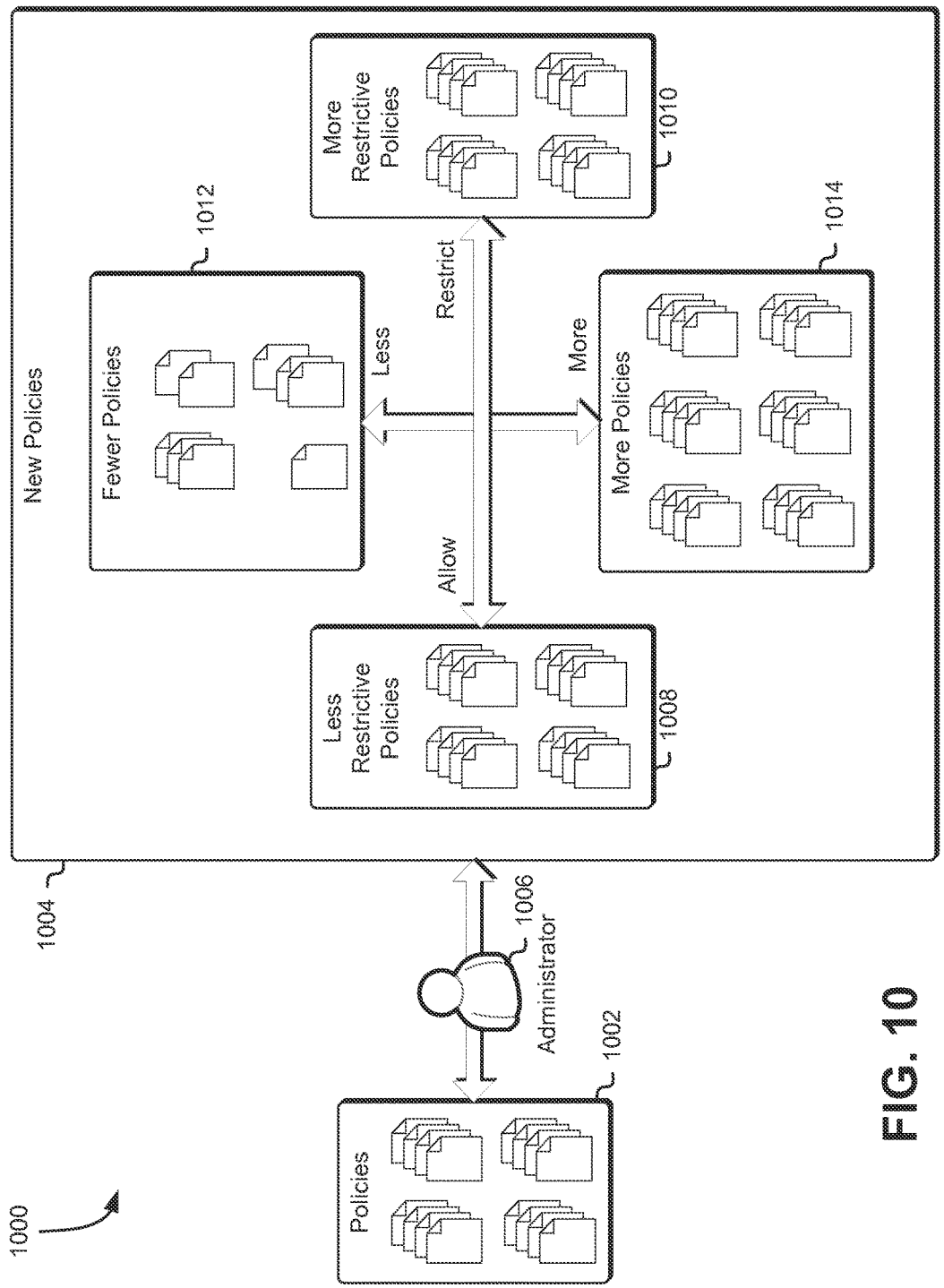
FIG. 10 illustrates an example diagram in which an administrator may adjust a plurality of access control policies in accordance with an embodiment.

FIG. 10 is an illustrative example of a diagram 1000 illustrating relationships between various aspects of the present disclosure in which an administrator may adjust a plurality of access control policies in accordance with an embodiment. An administrator 1006 associated with an organization may obtain a plurality of policies 1002 associated with that organization. The administrator 1006 may be a privileged user, a privileged process, or some other such entity with the granted ability to adjust one or more policy configurations. The policies 1002 may then have one or more policy configuration adjustments applied to alter the number and/or scope of the policies and produce new policies 1004. For example, the administrator 1006 may configure the policies to allow more actions, thereby producing a set of less restrictive policies 1008. Similarly, the administrator 1006 may configure the policies to restrict more actions, thereby producing a set of more restrictive policies 1010. The administrator 1006 may also choose to combine policies to produce fewer policies 1012 or may split policies to produce more policies 1014.

For example, a first group may have a set of permissions that are each also associated with a second group and one or more additional permissions not associated with the second group. The second group may also have one or more additional permissions not associated with the first group. Combining policies to produce fewer policies 1012 may be accomplished by combining the permissions of both groups (i.e., creating a union of the sets of policies) and moving all group members to a single group. Such a combination may result in a simpler set of policies at the expense of over-granting permissions to one or more users within the common group. Splitting policies to produce more policies 1014 may be accomplished by creating one policy with the unique permissions of the first group, creating a second policy with the unique permissions of the second group, and creating a third policy with the common permissions of the two groups and assigning the group members to one or more of the groups as appropriate. Such a split may result in more accurate policies at the expense of a more complex set of policies.

In some embodiments, the administrator 1006 may adjust the complexity and permissiveness in concert. In such embodiments, the administrator may choose a more efficient system with fewer policies that are less restrictive or may choose a more fine-grained system with more policies that are more restrictive (e.g., that are specifically targeted to certain users and classes of users). As may be contemplated, the types of policy configuration adjustments described herein are illustrative examples and other such policy configuration adjustments may be considered as within the scope of the present disclosure.

Figure 11:
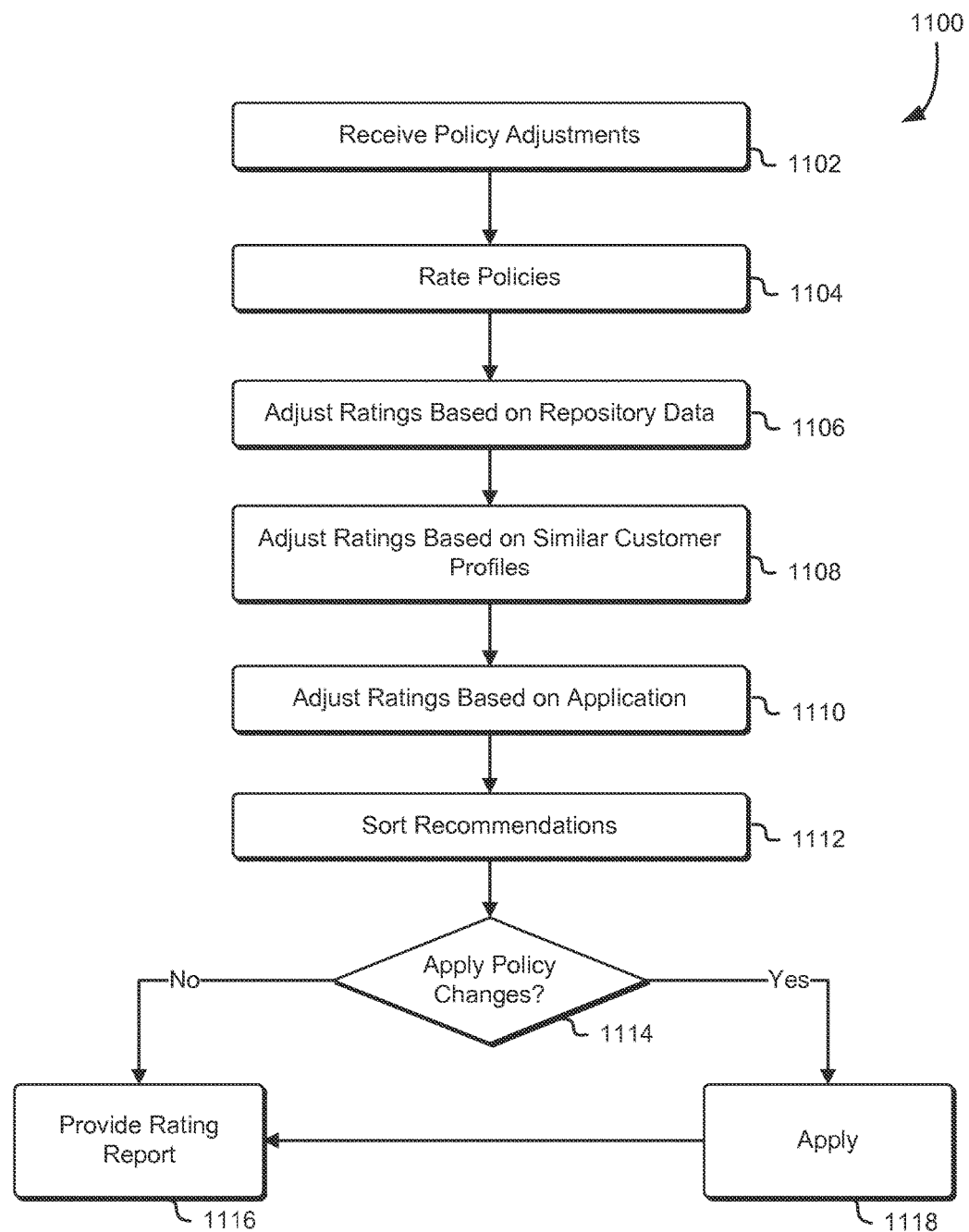
FIG. 11 illustrates an example of a process for ranking access control policies in accordance with an embodiment.

FIG. 11 is an illustrative example of a process 1100 for ranking adjustments to access control policies in accordance with an embodiment. A policy management service such as the policy management service 106 described in connection with FIG. 1 or a component thereof, such as a web server, may perform the process 1100 illustrated in FIG. 11.

In the example illustrated in FIG. 11, recommended policy adjustments may be ranked according to importance. A more important recommended policy adjustment is one that is more urgent, may have a greater effect, or may conform better to organizational aims. One or more policy adjustments such as those described herein may be received 1102 and may be rated 1104 according to one or more factors including, but not limited to, the destructiveness of the API request, the sensitivity of the resource associated with the permissions, the complexity of the policy, the permissiveness of the policy, conformance to default policy behavior, comparison to policies and/or usage patterns of other organizations, predicted effects of the policy changes, or other such factors. Each of these factors may be determined experimentally, may be based on observations of prior results, may be assigned by administrators, may be assigned by a resource provider, or may be determined using some other methodology.

This rating and/or ranking may be based on a risk assessment of the recommended policy change. For example, factors described above, such as the destructiveness of the API call, or the sensitivity of the resource associated with the permissions, or other such factors may aid in determining the risk associated with the recommended policy change. In an embodiment, the rating and/or ranking of the destructive of an API may be assessed by accessing a repository of API classifications wherein such classifications may be determined by the provider, determined and/or modified by a user of the API, or determined by a combination of these and/or other such factors. For example, an API that is mutation capable (capable of altering resources) may be determined to be more destructive than one that is not mutation capable. Based on resources associated with the API calls and/or on services associated with the API calls, an API may be assigned a mutation capability weight. Such a weight may be system dependent, user dependent, or a combination of system and user dependent. For example, a user dependent weight may permit users to adjust the mutation impact of an API and, thus, to influence risk assessments associated with particular APIs and policies associated with their own usage.

An API call that lists the contents of a resource may have a much lower risk associated with it than an API call that deletes the resource. Similarly, an API call that reads from a less sensitive resource (e.g., a resource with a lower security classification) may have a much lower risk than an API call that reads from a more sensitive resource. In an embodiment, risks may be assessed by applying recommended policy changes and recording and analyzing the result. A measurement of the changes that result from applying the recommended policy changes may be determined by, for example, simulating a set of resource access requests and comparing the number of denials (or acceptances) that occur before applying the recommended policy changes to the number of denials (or acceptances) that occur after applying the recommended policy changes. A measurement of changes that result from applying the recommended policy changes may also be determined by, for example, performing a risk assessment of making a set of API calls before applying the recommended policy changes and comparing that to a risk assessment of making the same set of API calls after applying the recommended policy changes. Such simulation of results may be performed in a test system, a virtual system, a production system, or some other system. Recommended policy changes that have a simulated high negative impact may then be used to further determine risk assessments for similar policy changes. For example, if any change to a read-only permission for a sensitive resource results in a negative impact to the system, that resource and/or that permission may be assessed with a high risk. As may be contemplated, the methods for risk assessment of recommended policy changes described herein are illustrative examples and other such methods for risk assessment of recommended policy changes may be considered as within the scope of the present disclosure.

For example, an API may comprise a plurality of API calls that can be made which may be assigned one of five categories rating the destructiveness of the API calls. An API call submitted to a provider that causes the provider to provide information about available resources may be the least destructive and may be assigned a rating of, for example, 0.2. Such a rating may be assigned by, for example, assigning a global mutation threshold to the effective permissions associated with the API call. Such a rating may also be assigned by, for example, applying a user-specified weighted set of rules to determine the rating. In an embodiment, the global mutation threshold is a heuristic that may be either the number of mutation capable permissions associated with the API call or ratio of the number of mutation capable permissions as compared to the number of non-mutation capable permissions associated with the API call.

An API call that causes the provider to create (e.g., provision) resources may be potentially more destructive (i.e., potentially more mutation capable) than the above API call and may be assigned a rating of, for example, 0.4. Similarly, an API call that causes a provider to remove (e.g., delete or terminate) resources may be even more destructive and may be assigned a rating of 0.9 and an API call that causes a provider to modify a resource (e.g., change the storage size or the storage class of a resource) may be assigned a rating of 0.7. Other API calls specified by the API may be individually or categorically assigned other ratings that may be the same as, higher than, or lower than these ratings. Ratings for a recommended policy adjustment may be combined by, for example, calculating a linear combination of the assigned ratings for the associated API calls and/or by calculating a weighted linear combination of the assigned ratings for the associated API calls. Ratings for a recommended policy adjustment may also be compared against one or more threshold values to, for example, discard lower rated adjustments and/or accentuate higher rated adjustments. As may be contemplated, the methods of assigning and processing ratings associated with recommended policy adjustments described herein are merely illustrative examples and other methods of assigning and processing ratings associated with recommended policy adjustments may be considered as within the scope of the present disclosure.

For example, policy adjustments which adjust permissions associated with API calls that allow the creation of virtual machine instances may be rated as somewhat permissive based on prior observance and/or based on a determination by the provider of the API. Such API calls may be ranked moderately high. By contrast, policy adjustments which adjust permissions associated with API calls that allow the destruction of virtual machine instances may be rated as both more permissive based on prior observance and/or based on a determination of the provider of the API and also may be rated as more destructive based on prior observance. Such API calls may be ranked much higher. Rating of policy adjustments may be based on a numerical system (i.e., by assigning a score to each one), on a relative scale, by numerically combining rating elements, or by some other rating method.

Ratings may then be adjusted 1106 based on other policy data. For example, a policy that grants access to a resource for a certain type of user, when no other organization with similar users may be rated higher. Similarly, a recommended policy adjustment that is based on more and/or more mature data (i.e., has been in place for a long time and has a large amount of request data associated with it) may be rated higher than a recommended policy adjustment that is based on less data and/or on less mature data. Other adjustments to the ratings such as adjustments made based on user profiles that are similar 1108 to a selected user profile or adjustments made based on the needs of an application 1110 (as described herein) may then be performed. The recommended policy adjustments may then be sorted by the rankings 1112. If it is determined to apply one or more of the recommended policy changes 1114, the recommended policy changes may be applied 1118 and, in some embodiments, a report of the changes may be provided 1116.

Figure 12:
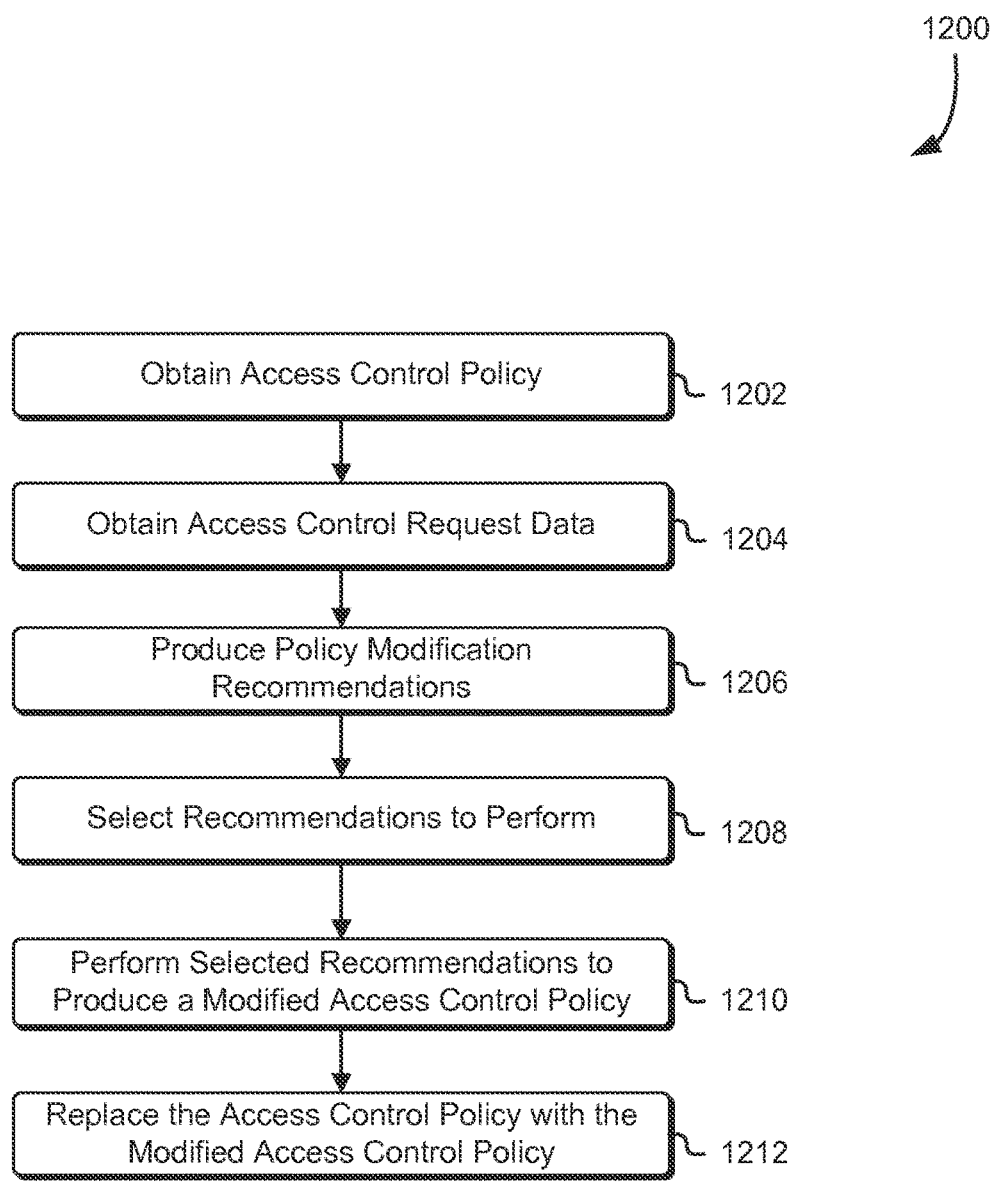
FIG. 12 illustrates an example of a process for automatically updating an access control policy in accordance with an embodiment.

FIG. 12 is an illustrative example of a process 1200 for automatically updating an access control policy in accordance with an embodiment. A policy management service such as the policy management service 106 described in connection with FIG. 1 or a component thereof, such as a web server, may perform the process 1200 illustrated in FIG. 12. The policy management service may first obtain an access control policy 1202 as described herein. For example, the policy management service may obtain an access control policy from a policy repository. The policy management service may next obtain access control request data 1204 from an access control data repository that may contain access request logs and/or aggregations of such logs as described herein. The policy management service may then produce a set of permission modification recommendations 1206. The set of permission modification recommendations (also referred to as policy modification recommendations) may include a set of possible actions that, if performed, may address one or more identified missing permissions and/or needed permissions associated with the policy. The policy management service may then select a subset of the set of permission modification recommendations to perform 1208 based, for example, on the ranking of permission modification recommendations described herein. The policy management service may then perform a selected subset of the set of permission modification recommendations and may alter the policy by performing the selected permission modification recommendations to produce a modified access control policy 1210. The policy management service may finally replace the access control policy with the modified access control policy 1212 by, for example, storing it in the policy repository.

Figure 13:
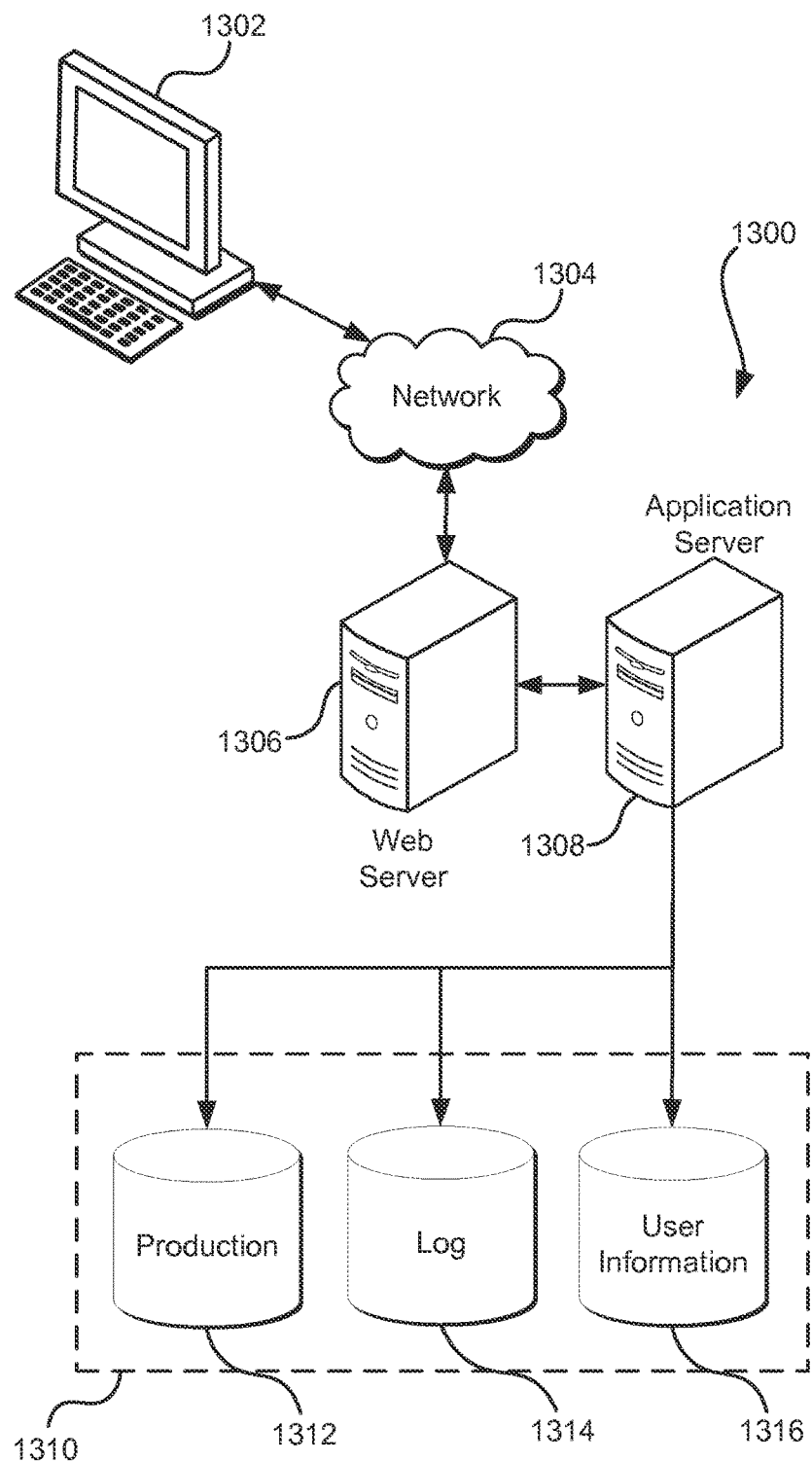
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages, or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a policy management service, an access control policy associated with a user of a computing resource service provider, the access control policy having a corresponding set of effective permissions associated with one or more resources of the computing resource service provider;
   obtaining usage history information generated as a result of a plurality of previously submitted requests for access to the one or more resources that implicate the access control policy, the usage history information comprising an indication of one or more outcomes of the plurality of previously submitted requests;
   producing a set of policy modification recommendations based at least in part on a comparison of the usage history information to the access control policy, each policy modification recommendation of the set of policy modification recommendations specifying an alteration to the set of effective permissions;
   selecting a policy modification recommendation from the set of policy modification recommendations;
   altering the access control policy in accordance with the selected policy modification recommendation by at least removing an unnecessary permission or adding a missing permission to the access control policy to produce a modified access control policy;
   presenting the modified access control policy to the policy management service to cause the access control policy to be replaced by the modified access control policy; and
   controlling access to at least one of the one or more resources using the modified access control policy.

2. The computer-implemented method of claim 1, wherein selecting the policy modification recommendation from the set of policy modification recommendations further comprises selecting the recommended policy modification from a subset of the set of policy modification recommendations based at least in part on a risk assessment, the risk assessment based at least in part on a result of applying the subset of the set of policy modification recommendations.

3. The computer-implemented method of claim 1, wherein altering the access control policy in accordance with the selected policy modification recommendation to produce the modified access control policy comprises changing the set of permissions.

4. A non-transitory computer-readable storage medium having stored thereon executable instructions that, as a result of execution by one or more processors of a computer system, cause the computer system to at least:
  determine a set of effective permissions, each effective permission of the set of effective permissions corresponding to a right of a principal to perform an action in connection with a resource of one or more resources;
  obtain usage history information generated as a result of a plurality of previously submitted requests for access to the one or more resources that implicate the set of effective permissions, the usage history information comprising an indication of one or more outcomes of the plurality of previously submitted requests;
  produce, based at least in part on comparing the obtained usage history information to the set of effective permissions, a set of permission modification recommendations, each permission modification recommendation of the set of permission modification recommendations specifying an alteration to the set of effective permissions;
  provide a subset of the set of permission modification recommendations;
  apply the subset of the set of permission modification recommendations to the set of effective permissions by at least removing an unnecessary permission or adding a missing permission to produce a modified set of effective permissions;
  presenting the modified set of effective permissions to cause a policy management service to replace the set of effective permissions with the modified set of effective permissions; and
  control access to the one or more resources using the modified set of effective permissions.

5. The non-transitory computer-readable storage medium of claim 4, wherein the subset of the set of permission modification recommendations is selected from the set of permission modification recommendations based at least in part on a measurement of changes to one or more of the one or more effective permissions as a result of applying the subset of the set of permission modification recommendations.

6. The non-transitory computer-readable storage medium of claim 5, wherein the measurement of changes is based at least in part on one or more risk assessments of the subset of the set of permission modification recommendations.

7. The non-transitory computer-readable storage medium of claim 4, wherein the instructions are further configured to cause the computer system to generate a request for approval for the subset of the set of permission modification recommendations from a user of the computer system.

8. The non-transitory computer-readable storage medium of claim 4, wherein the subset of the set of permission modification recommendations is selected from the set of permission modification recommendations based at least in part on comparing a recommended policy to a first policy, the recommended policy obtained by applying the subset of the set of permission modification recommendations to the set of effective permissions, the first policy comprising a set of first policy permissions, at least a subset of the set of first policy permissions differing from the one or more permissions of the effective set of permissions.

9. The non-transitory computer-readable storage medium of claim 8, wherein the instructions further comprise instructions that, as a result of execution by the one or more processors, cause the computer system to select the set of first policy permissions based at least in part on reducing a risk assessment of the recommended policy.

10. The non-transitory computer-readable storage medium of claim 8, wherein the instructions further comprise instructions that, as a result of execution by the one or more processors, cause the computer system to select the set of first policy permissions based at least in part on decreasing a complexity of the recommended policy.

11. The non-transitory computer-readable storage medium of claim 4, wherein one or more permission modification recommendations of the set of permission modification recommendations is configured to, when performed by the computer system, combine a subset of the set of effective permissions to produce a new effective permission of the set of effective permissions.

12. The non-transitory computer-readable storage medium of claim 4, wherein one or more permission modification recommendations of the set of permission modification recommendations is configured to, when performed by the computer system, add one or more new effective permissions to the set of effective permissions, each of the one or more new effective permissions based at least in part on the plurality of previously submitted application programming interface requests.

13. A system, comprising:
  one or more machine-readable mediums having stored thereon a set of instructions, which if performed by one or more processors, cause the system to at least:
    obtain usage history information indicating requests for access to one or more resources associated with a first user of the system, the usage history information comprising an indication of one or more outcomes of the requests for access to the one or more resources;
    produce a set of permission modification recommendations based at least in part on comparing a set of effective permissions to the obtained usage history information, each permission modification recommendation of the set of permission modification recommendations specifying an alteration to one or more permissions of the set of effective permissions;
    select a permission modification recommendation from the set of permission modification recommendations, the selected permission modification recommendation specifying one or more modifications to a subset of the set of effective permissions;
    apply the selected permission modification recommendation to the set of effective permissions by at least removing an unnecessary permission or adding a missing permission to produce a modified set of effective permissions; and
    present the modified set of effective permissions to a policy management service to cause access to the one or more resources to be controlled using the modified set of effective permissions.

14. The system of claim 13, wherein the obtained usage history information is generated as a result of a plurality of previously submitted application programming interface requests that implicate the set of effective permissions.

15. The system of claim 13, wherein the set of instructions causes the system to replace the set of effective permissions with the modified set of effective permissions without requiring explicit approval for the modified set of effective permissions.

16. The system of claim 13, wherein each effective permission of the set of effective permissions specifies a principal, a resource, and a set of conditions.

17. The system of claim 13, wherein the selected permission modification recommendation, when applied to the effective set of permissions, alters one or more permissions specified in a group policy, the group policy applicable to any principal in a group of principals.

18. The system of claim 13, wherein the selected permission modification recommendation, when applied to the effective set of permissions, alters one or more permissions specified in a delegation policy, the delegation policy applicable to any principal authorized to assume one or more permissions specified by the delegation policy.

19. The system of claim 13, wherein the selected permission modification recommendation, when applied to the effective set of permissions, alters a set of principals who are authorized delegates.

20. The system of claim 13, wherein the selected permission modification recommendation indicates a change to a definition of a group of principals, the change to the definition of the group of principals including at least one of: adding one or more principals to the group of principals or removing one or more principals from the group of principals.

21. The system of claim 13, wherein the set of permission modification recommendations is based at least in part on a set of effective permissions associated with a second user of the system, the second user selected based at least in part on sharing one or more attributes with the first user.

22. The system of claim 13, wherein the selected permission modification recommendation is selected from the set of permission modification recommendations based at least in part on applying each permission modification recommendation of the set of permission modification recommendations to the set of effective permissions to simulate the effect of the permission modification recommendation.

23. The computer-implemented method of claim 1, wherein producing the set of policy modification recommendations comprises:
   determining if any unnecessary permissions are granted by the access control policy; and
   determining if there are any permissions missing from the access control policy.

* * * * *